(12) United States Patent
Xiaowei

(10) Patent No.: US 11,233,241 B2
(45) Date of Patent: Jan. 25, 2022

(54) PREPARATION OF: I. INTERCALATIVE METAL OXIDE/CONDUCTIVE POLYMER COMPOSITES AS ELECTRODE MATERIALS FOR RECHARGEABLE BATTERIES; II. SODIUM RICH MANGANESE OXIDE HYDRATE WITH CAPACITY FOR AQUEOUS NA-ION ELECTROCHEMICAL ENERGY STORAGE

(71) Applicant: THE UNIVERSITY OF NEW HAMPSHIRE, Durham, NH (US)

(72) Inventor: Teng Xiaowei, Durham, NH (US)

(73) Assignee: The UNIVERSITY OF NEW HAMPSHIRE, Durham, NH (US)

( * ) Notice: Subject to any disclaimer, the term of this patent is extended or adjusted under 35 U.S.C. 154(b) by 0 days.

(21) Appl. No.: 15/931,069

(22) Filed: May 13, 2020

(65) Prior Publication Data
US 2021/0028460 A1    Jan. 28, 2021

Related U.S. Application Data

(63) Continuation of application No. PCT/US2018/060677, filed on Nov. 13, 2018.

(60) Provisional application No. 62/585,031, filed on Nov. 13, 2017.

(51) Int. Cl.
*H01M 4/00* (2006.01)
*H01M 4/62* (2006.01)
*H01M 4/505* (2010.01)

(52) U.S. Cl.
CPC ........... *H01M 4/622* (2013.01); *H01M 4/505* (2013.01)

(58) Field of Classification Search
CPC .............................. H01M 4/622; H01M 4/505
See application file for complete search history.

(56) References Cited

U.S. PATENT DOCUMENTS

| | | | |
|---|---|---|---|
| 2002/0022183 A1 | 2/2002 | Ogawa et al. | |
| 2003/0099884 A1 | 5/2003 | Chiang et al. | |
| 2014/0315081 A1* | 10/2014 | Zhang | H01M 4/0416 429/212 |
| 2017/0088471 A1* | 3/2017 | Randall | C04B 35/453 |

OTHER PUBLICATIONS

International Search Report and Written Opinion from related matter PCT/US2018/60677, dated May 14, 2019.
Murugan et al., 'Synthesis and characterization of a new organo-inorganic poly(3,4-ethylene dioxythiophene) PEDOT/V2O5 nanocomposite by intercalation', Journal of Materials Chemistry, vol. 11, Aug. 31, 2001, p. 2470-2475.
Lu et al., 'Reverse microemulsion preparation and characterization of ultrafine orthorhombic LiMnO2 powders for lithium-ion secondary batteries', Journal of the European Ceramic Society, vol. 24, Sep. 24, 2003, p. 717-723.

* cited by examiner

*Primary Examiner* — Austin Murata
(74) *Attorney, Agent, or Firm* — Grossman, Tucker, Perrault & Pfleger, PLLC

(57) ABSTRACT

The present invention is directed at intercalative metal oxide/conductive polymer composites suitable for use as electrode materials for rechargeable batteries. The composites can be prepared by agitation of the metal oxide and the conductive polymer in aqueous media. The present invention is also directed at a sodium rich layered manganese oxide hydrate prepared by annealing manganese (II, III) oxide and sodium hydroxide. The sodium rich manganese (III, IV) oxide so formed indicates an enhanced capacity for Na-ion storage suitable for the use of electrode materials for aqueous energy storage.

10 Claims, 26 Drawing Sheets

PREPARATION OF: I. INTERCALATIVE METAL OXIDE/CONDUCTIVE POLYMER COMPOSITES AS ELECTRODE MATERIALS FOR RECHARGEABLE BATTERIES; II. SODIUM RICH MANGANESE OXIDE HYDRATE WITH CAPACITY FOR AQUEOUS NA-ION ELECTROCHEMICAL ENERGY STORAGE

CROSS-REFERENCE TO RELATED APPLICATIONS

The present application is a by-pass continuation of PCT/US18/60677 filed on Nov. 13, 2018 and claims the benefit of the filing date of U.S. Provisional Application, Ser. No. 62/585,031, filed Nov. 13, 2017, both of which are fully incorporated herein by reference.

GOVERNMENT RIGHTS CLAUSE

This invention was made with government support under Prime Contract No. DE-SC0010286 awarded by the U.S. Department of Energy. The government has certain rights in the invention.

FIELD

The present invention is directed at intercalative metal oxide/conductive polymer composites suitable for use as electrode materials for rechargeable batteries. The composites can be prepared by agitation of the metal oxide and the conductive polymer in aqueous media. The present invention is also directed at a sodium rich layered manganese oxide hydrate prepared by annealing manganese (II, III) oxide and sodium hydroxide. The sodium rich manganese (III, IV) oxide so formed indicates an enhanced capacity for Na-ion storage suitable for the use of electrode materials for aqueous energy storage.

BACKGROUND

The preparation of effective electrode materials especially cathode materials for rechargeable energy storage devices including supercapacitors and batteries have attracted increased attention. Many metal oxide, for example vanadium pentoxide, manganese oxide, cobalt oxide are the most promising layered electrode materials for rechargeable lithium/sodium/potassium batteries because of its high-energy storage capacities. However, the capacity retention of these electrode materials upon cycling and power performance (time required to charge and discharge the devices) are unsatisfactory, partially due to their poor electrical conductivity. Several approaches have been developed on the preparation of new electrode materials to ameliorate these limitations, including simply mixing electrode material with carbon black or coating the electrode material with more conductive layers. In particular, the preparation of metal oxide/conductive polymer composite is a very rapidly developing area of electrode materials development. Compared with simple mixtures of metal oxide and conducting polymer, preparation of intercalative metal oxide/conducting polymers is a very promising approach to making electrode materials, where conductive polymer is inserted between metal oxide layers, so that semiconductive metal oxide materials are in close proximity to conductive polymer. However, typical preparation routines for intercalative composite materials include in situ polymerization, or require assistance of heat or even microwave radiation, and therefore involve relatively long processing time, arduous preparation procedures and have difficulty in scale-up production. It is, therefore, necessary to develop simpler and more energy-efficient methods of synthesis method in this regard.

In related context, developing electrochemical energy storage (EES) technologies using safe and earth-abundant materials becomes increasingly attractive for economically storing the electric power generated by solar and wind. Aqueous EES devices using Na-ions as charge carriers have been promising alternatives to non-aqueous lithium-ion batteries (LIBs) for its low cost, high safety and availability of Na sources in terrestrial reserves. However, the storage of Na-ions is challenging because of its relatively large ionic radius, so that LIB host materials (especially cathode) usually with a close-packed array of oxide ion may not be able to accommodate the Na-ion for reversible insertion and extraction.

Two design principles have been used to tackle the intercalation of Na-ion. One is the replacement of oxygen anions ($O^{2-}$) with anions that have weaker bonding with metal cations, so that cations are sufficiently mobile in the electrode. Recent studies show promise of hexacyano ions $(C\equiv N)_6^{6-}$ based electrode materials for Na- and K-ions storage due to their weakened bonding between cyanide $(C\equiv N)^-$ and cations. Some reports indicate that potassium copper hexacyanoferrate and its analogues can function as stable electrode materials for aqueous K- and Na-ion storage. Sodium manganese hexacyanoferrate has been reported by to show relatively good energy performance and cycling life in a non-aqueous electrolyte.

Another approach to design a Na-ion electrode is to introduce a relatively large interstitial host framework. These materials with planar or zigzag layers show different polymorphs (P2, P3 or O3 symmetry) with respect to the sites of the intercalated alkali ions by altering the stacking of transition metal-oxygen octahedra ($[MO_6]$). However, the mechanistic understanding of storage of Na-ion inside various host materials is still far from settled. This is largely due to the different intercalation chemistry of Na-ions from that of Li-ions so that the fundamental understanding obtained from Li-ion storage may not be directly applied to Na-ion.

Recently, efforts have been devoted to the studies of the storage mechanisms of various alkali ions. For example, O3-type layered $LiMnO_2$ (ABC oxygen stacking) suffered from degradation to spinel structure and thus the impaired capacity for Li-storage due to the migration of Mn ions during the cycling. In contrast, the $NaMnO_2$ counterpart had a high energy barrier for Mn ion migration, which prevented cation mixing and thus sustained the layered structure during the Na-ion intercalation/deintercalation. Compared with O3-type $NaMnO_2$, birnessite $\delta$-$MnO_2$ also has a layered structure containing two-dimensional sheets of edge-shared $MnO_6$ octahedra with a general formula of $A_xMnO_2 \cdot H_2O$ (A: $H^+$, $Li^+$, $Na^+$, or $K^+$; X: usually less than 0.2).[1-5] The studies of birnessite electrode in aqueous electrolyte have been reported. However, even though the birnessite has a rather large interlayer distance (~7 Å), the storage capacity was typically low for aqueous Na-ion storage (<60 mA h $g^{-1}$) due to the limited potential window (~1.2 V) and ineffective redox process. Much less work on improving the aqueous Na-ion storage capacity in birnessite has been reported to date.

DETAILED DESCRIPTION

The present invention is directed at preparation of intercalative (layered) metal oxide/conductive polymer composites as electrode materials for rechargeable batteries. Preferred metal oxides include those oxides that can form a two-dimensional plane with relatively strong in-plane chemical bonding with a dissociation energy of 4 to 7 electron volts (eV) (the average vanadium-oxygen ionic bonding is around 6.7 eV and manganese-oxygen ionic bonding is around 4.2 eV) and relatively weak Van der Waals bonding between planes with a dissociation energy of about 0.01 eV. Preferred examples include $V_2O_5$ and $LiMnO_2$. It is contemplated that other suitable oxides may include $TiO_2$, $MoO_2$, $MoO_3$, $Nb_2O_5$ and $LiCoO_2$. The conductive polymer herein is preferably a positively charged polymeric ionomer in combination with a negatively charged polymeric ionomer. Reference to ionomer herein is to be understood as a charged polymer stabilized by ionic cross-links.

One particularly preferred conductive polymer includes as the positive charged ionomer poly(3,4-ethylene dioxythiophene) (PEDOT) in combination with the negatively charged ionomer poly(styrenesulfonate) (PSS). The conductive polymer may therefore be conveniently identified as PEDOT:PSS. In PEDOT:PSS, part of the sulfonyl groups is deprotonated and carry a negative charge. The PEDOT is a conjugated polymer and carries positive charges based upon polythiophene.

The intercalative structure (layering of the oxide and conductive polymer) is preferably achieved herein by agitation (e.g. stirring) of the metal oxide and the conductive polymer (i.e. positively charged polymeric ionomer in combination with negatively charged polymeric ionomer) in aqueous media. For example, the intercalative structure herein was observed to form when agitating the metal oxide with the PEDOT:PSS in water for an extended period of time, such as for 100 to 200 hours. Preferably, the metal oxide to conductive polymer weight ratio is in the range of 1:1 to 8:1, more preferably 3:1 to 5:1. One particularly preferred weight ratio of metal oxide to conductive polymer is 4:1.

The above procedure is a relatively scalable synthetic routine and is preferably carried on at room temperature without heat or radiation. The resulting nanocomposites have been characterized by powder X-ray diffraction, Raman spectroscopy and transmission electronic microscope analyses. The thickness of the layered structure is contemplated to fall in the range of 1-5 nm up to 30 nm.

Furthermore the application potential of the nanocomposites herein have been tested in an aqueous sodium batteries test, which display some synergistic effects between the metal oxides ($V_2O_5$, $NaMnO_2$) and the intercalative conductive polymer (PEDOT:PSS). The results showed that intercalative metal oxide/conductive polymer composites show 100% to 400% enhanced capacity, as well as much improved power performance.

Figure 1:
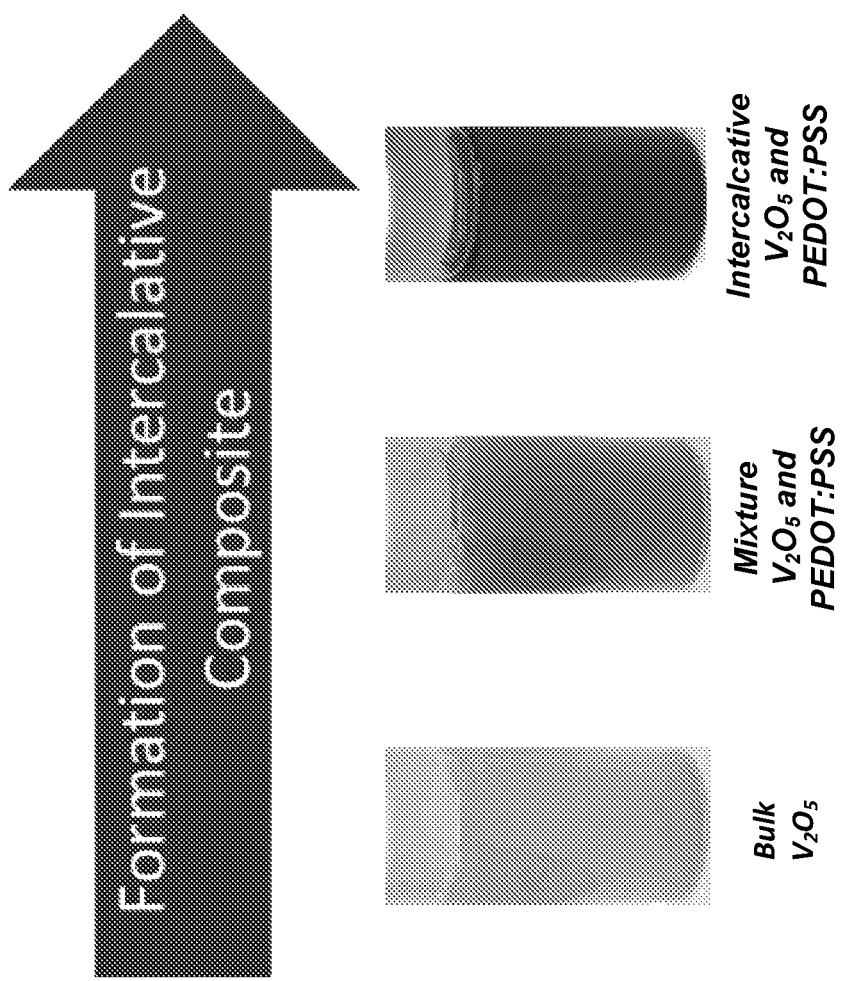
FIG. 1 shows photos of bulk $V_2O_5$ in water, simple mixture of $V_2O_5$, PEDOT:PSS and water, as well as intercalative $V_2O_5$/PEDOT:PSS composite. The color change reflects structural differences of intercalative $V_2O_5$/PEDOT:PSS composite compared with $V_2O_5$ or simple mixture of $V_2O_5$ and PEDOT:PSS.

The preparation of intercalative V2O5/PEDOT:PSS nanocomposite was as noted preferably conducted in aqueous solution at room temperature using the conductive polymer poly(3,4-ethylenedioxythiophene)-poly(styrenesulfonate) [PEDOT:PSS]. A mixture of 100 mg of commercial V2O5 bulk material and 25 mg of PEDOT:PSS were submerged in 6 mL of deionized (DI) water in a scintillation vial. The mixture was vigorously stirred at approximately 500 rpm for one week, accompanied with a noticeable color change (FIG. 1). The dispersion of the commercially available $V_2O_5$ powder in DI water is light yellow in color. The conductive polymer PEDOT:PSS, a light blue color, is added to the $V_2O_5$ giving the mixture a slightly green tinge. Over the one week mixing period, a color change from the green-yellow color of the mixture to a dark green color occurs. The oxidation state of the $V^{5+}$ likely reduced to a $V^{4+/5+}$ mixture due to the interaction with PEDOT:PSS.

Figure 2:
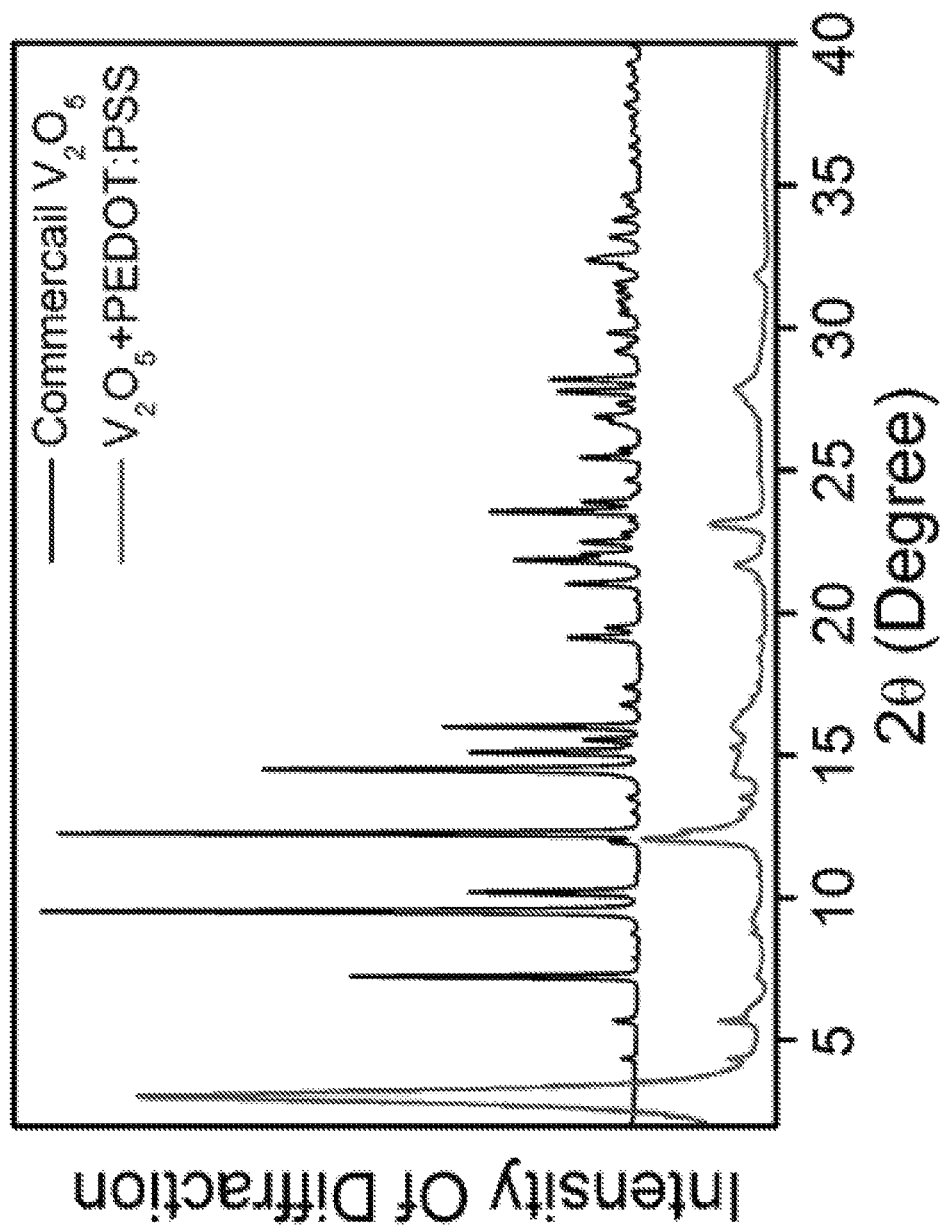
FIG. 2 shows XRD patterns of commercial $V_2O_5$ (the precursor for making intercalative $V_2O_5$/PEDOT:PSS composite) and intercalative $V_2O_5$/PEDOT:PSS composite.

Through XRD a significant change can be clearly seen that the crystal structure and morphology is affected by the interaction with the PEDOT:PSS (FIG. 2). The $V_2O_5$ is initially highly crystalline having relatively strong Bragg features, orthorhombic cell with Pmmn symmetry. However after mixing in DI water with the PEDOT:PSS for two weeks a layered structure is formed. The PEDOT:PSS appears to insert into the interlayer gap of the bulk $V_2O_5$ materials having a weak Van der Waals force between layers, which finally facilitates the formation of the intercalative $V_2O_5$/PEDOT:PSS nanosheets through a exfoliation process. The diffraction pattern of the exfoliated layered structure produces only a few small Bragg peaks in the XRD pattern. The d-spacing of the layered peak $d_{001}$=13.67 Å (3.05° 2θ).

Figure 3:
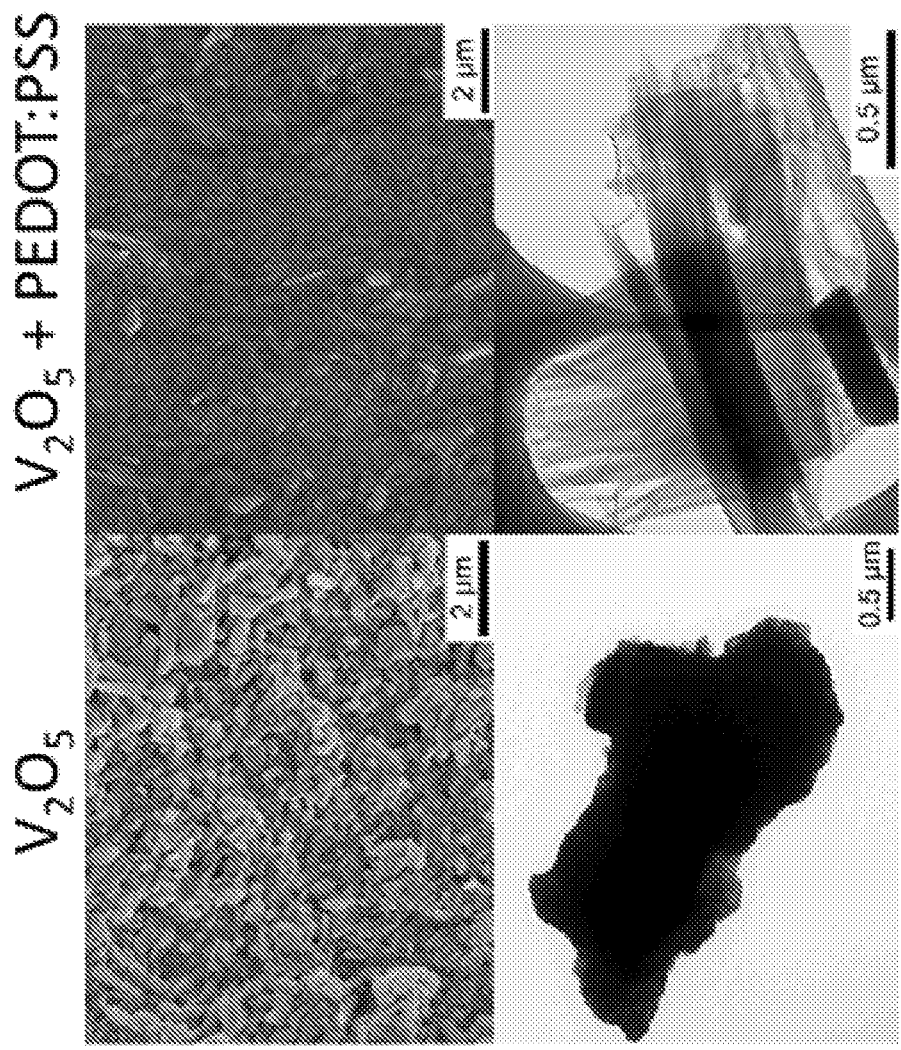
FIG. 3 shows SEM and TEM images of commercial $V_2O_5$ (the precursor for making intercalative $V_2O_5$/PEDOT:PSS composite) and intercalative $V_2O_5$/PEDOT:PSS composite. The latter shows distinct morphological changes from bulk particles to layered structure.

SEM and TEM images show that the $V_2O_5$ before exfoliation appears as particles and after exfoliation the V2O5-PEDOT:PSS appear as ribbon like strands appearing to pull away from each other and the bulk particles (FIG. 3).

Figure 4:
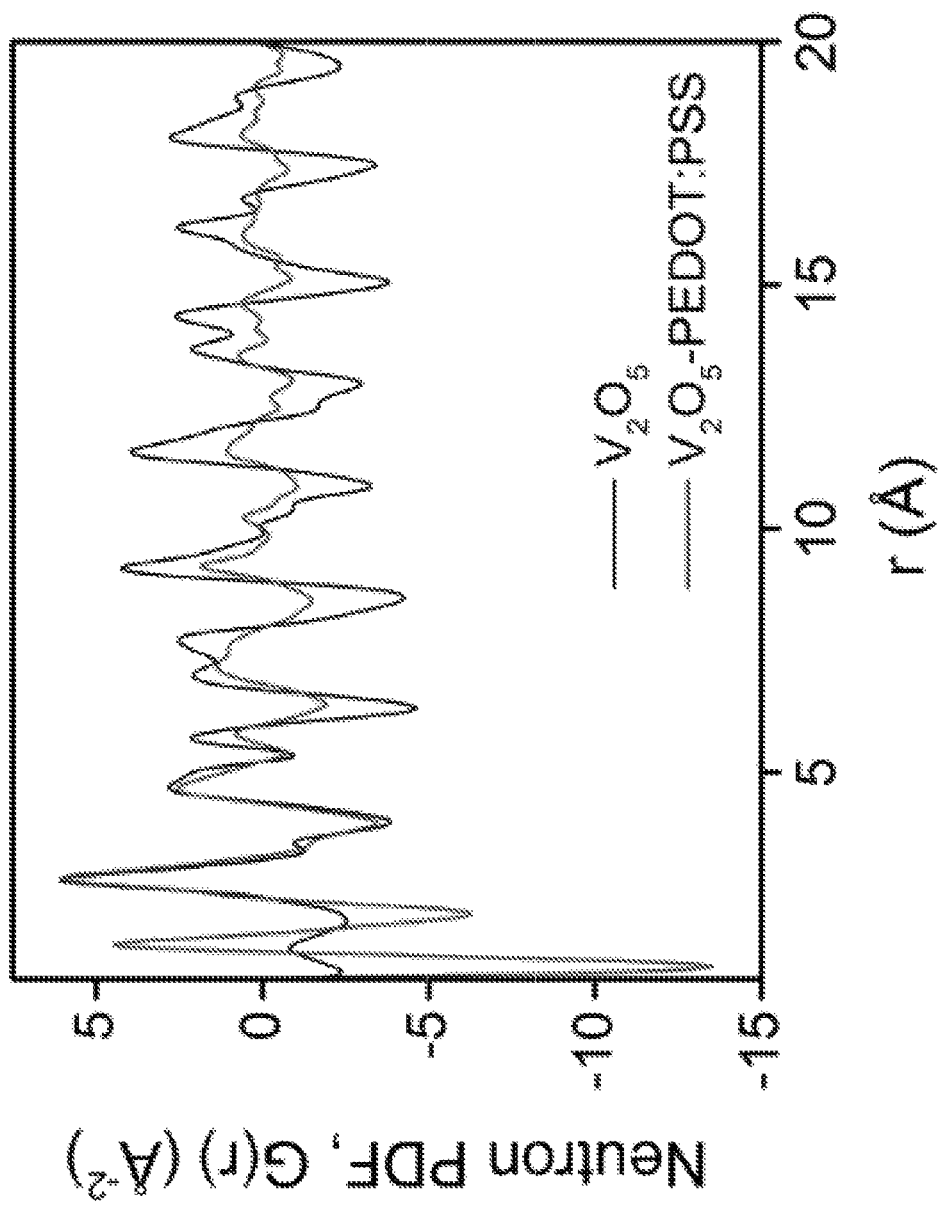
FIG. 4 shows neutron pair distribution function (PDF) analysis of commercial $V_2O_5$ (the precursor for making intercalative $V_2O_5$/PEDOT:PSS composite), and intercalative $V_2O_5$/PEDOT:PSS composite. The latter shows distinctly decreased coherent length, corresponding well to the formation of layered structure.

Neutron pair distribution function (PDF) analysis was chosen to elucidate the interaction between the $V_2O_5$ and PEDOT:PSS due to the lack of Bragg features in the diffraction pattern (FIG. 4). The exfoliated layer phase was identified as a bi-layered $V_2O_5$ structure, having a coherence length of 15 Å, a significant decrease as compare to the bulk phase. There was still a detectable bulk phase in the PDF, 8% by mass. A simplified model currently has atoms with the correct ratio of elements for the PEDOT:PSS in the interlayer spacing but not in the correct conformation. The low r-space data is dominated by water and the PEDOT:PSS. The first strong negative peak at ~1.01 Å is due to both the O—H interaction water (0.96 Å) and the interaction of the polymer C—H (1.1 Å). The strong positive peak at ~1.45 Å is the C—C interaction from the conductive polymer and a small portion is due to the H—H correlation from water. The second negative peak at 2.09 Å is C—H interaction but a carbon atom interacting with a hydrogen atom bonded to a nearest neighbor carbon atom.

Figures 5A, 5B:
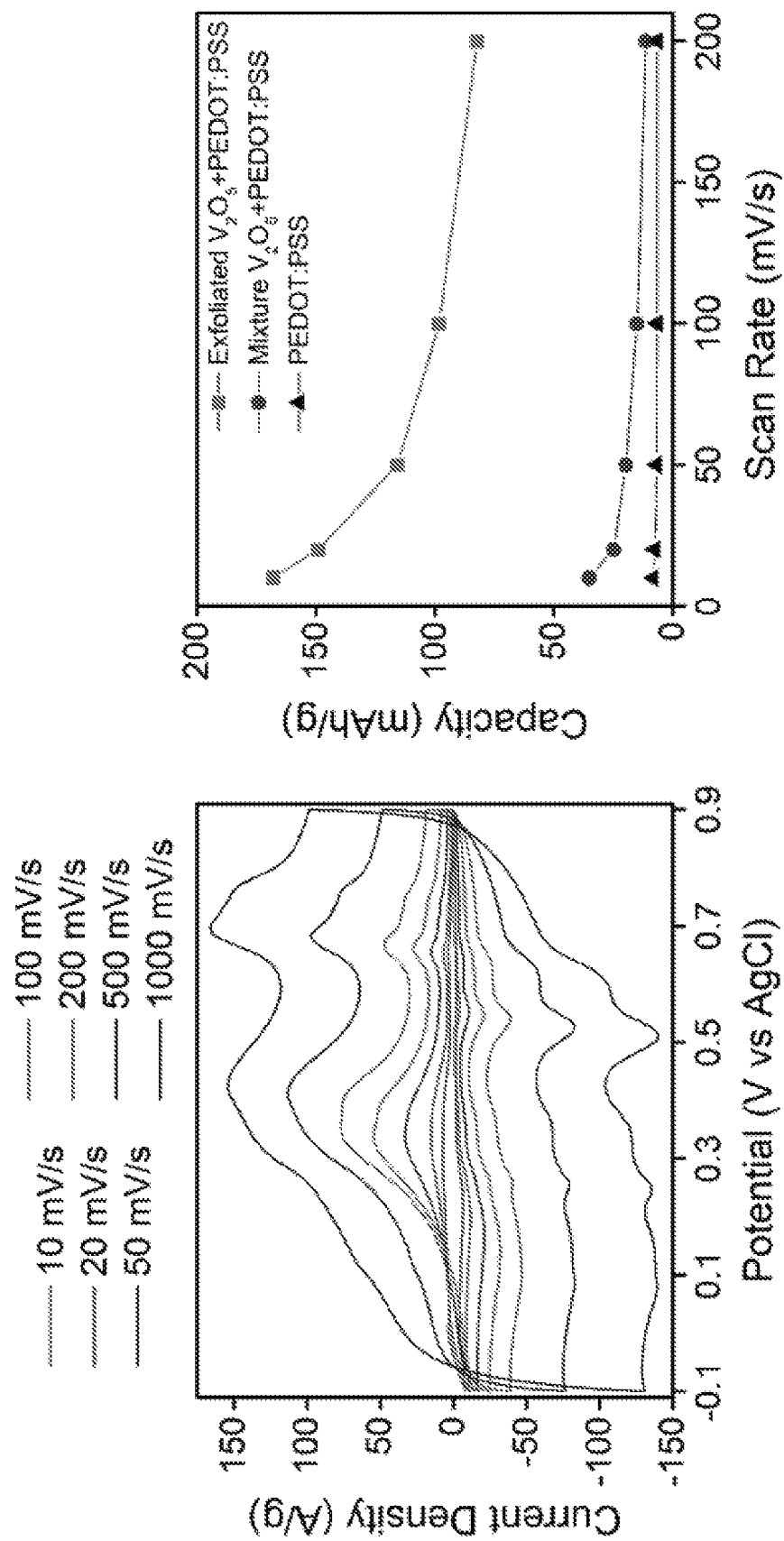
FIG. 5A shows electrochemical tests of intercalative $V_2O_5$/PEDOT:PSS composite at the scan rate ranging from 10 mV/sec to 1000 mV/sec in an aqueous KCl electrolyte.
FIG. 5B shows electrochemical tests of bulk $V_2O_5$, simple mixture of $V_2O_5$ and PEDOT:PSS, as well as intercalative $V_2O_5$/PEDOT:PSS composite. The latter showed enhanced capacity (more than three times).
Figure 6B:
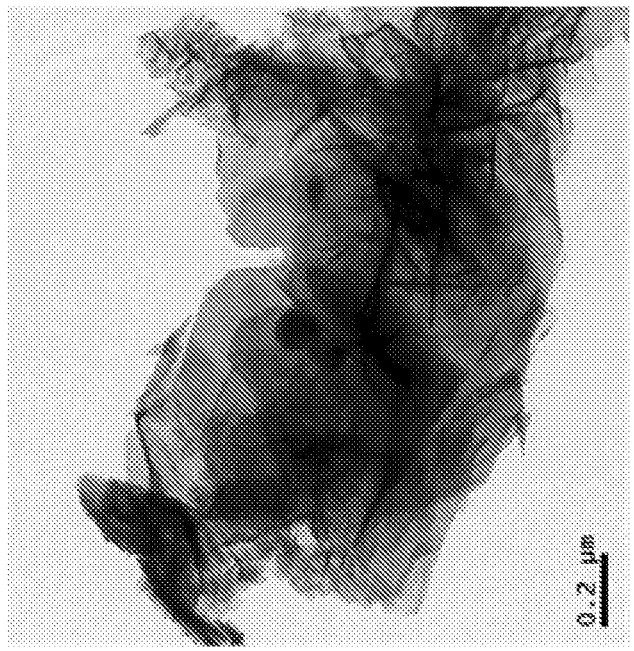
FIG. 6B shows intercalative $LiMnO_2$/PEDOT:PSS nanosheet.
Figure 6A:
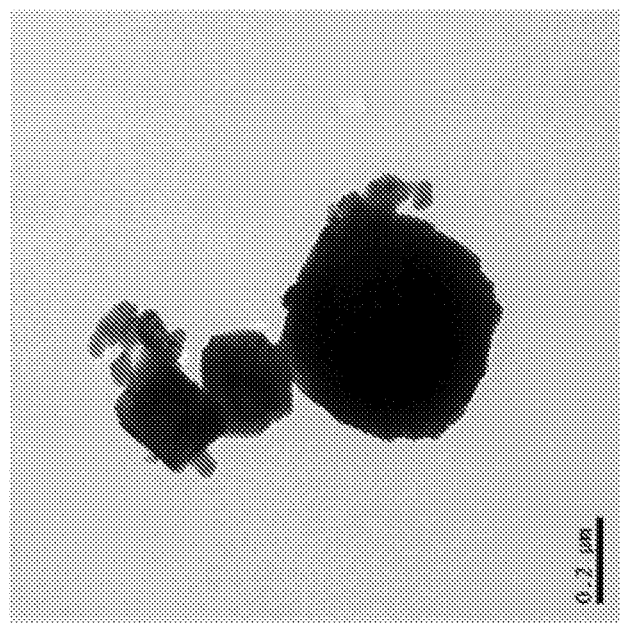
FIG. 6A shows TEM images of $LiMnO_2$ bulk material.
Figure 7:
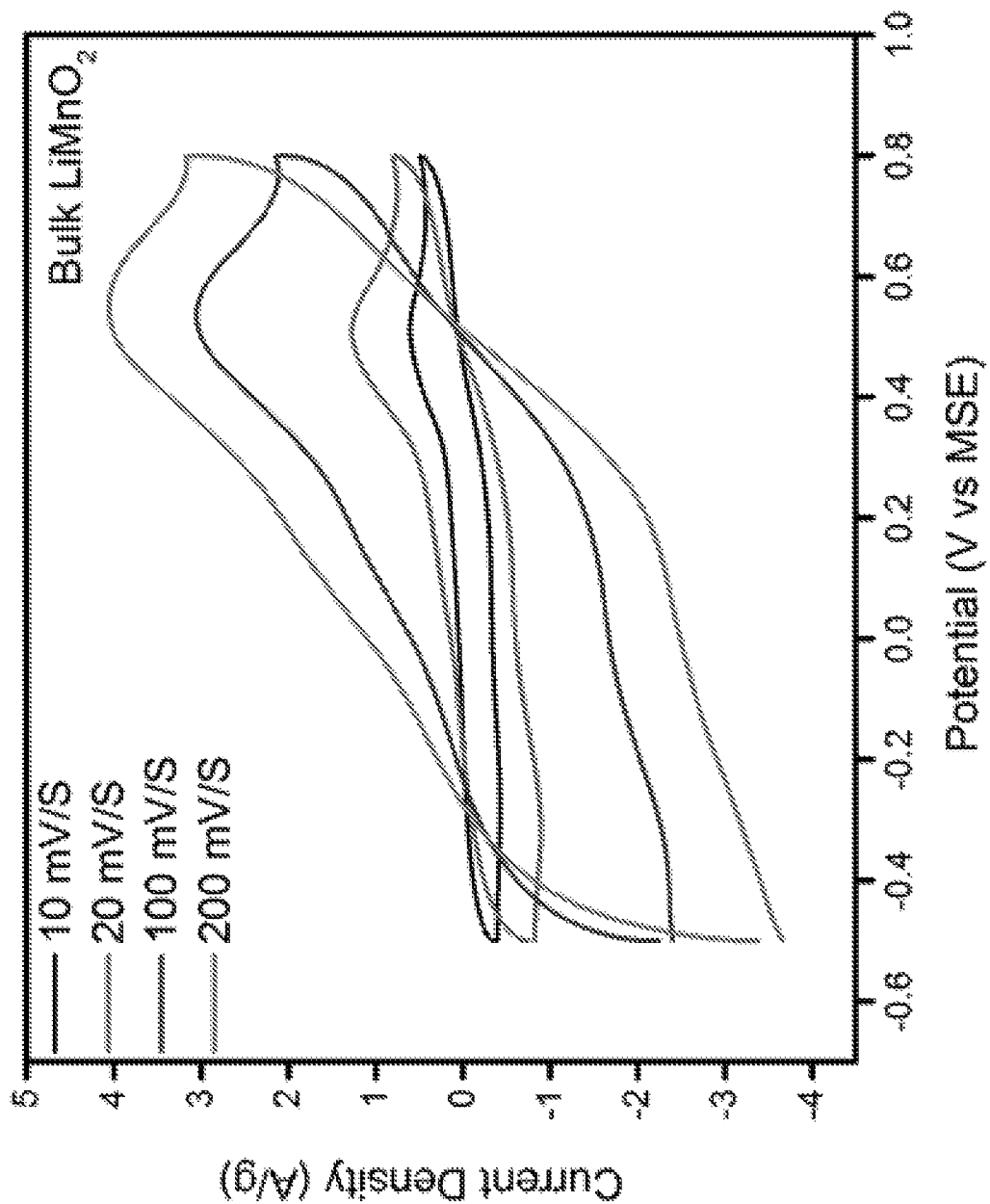
FIG. 7 shows cyclic voltammetry measurements of bulk $LiMnO_2$ materials.
Figure 8:
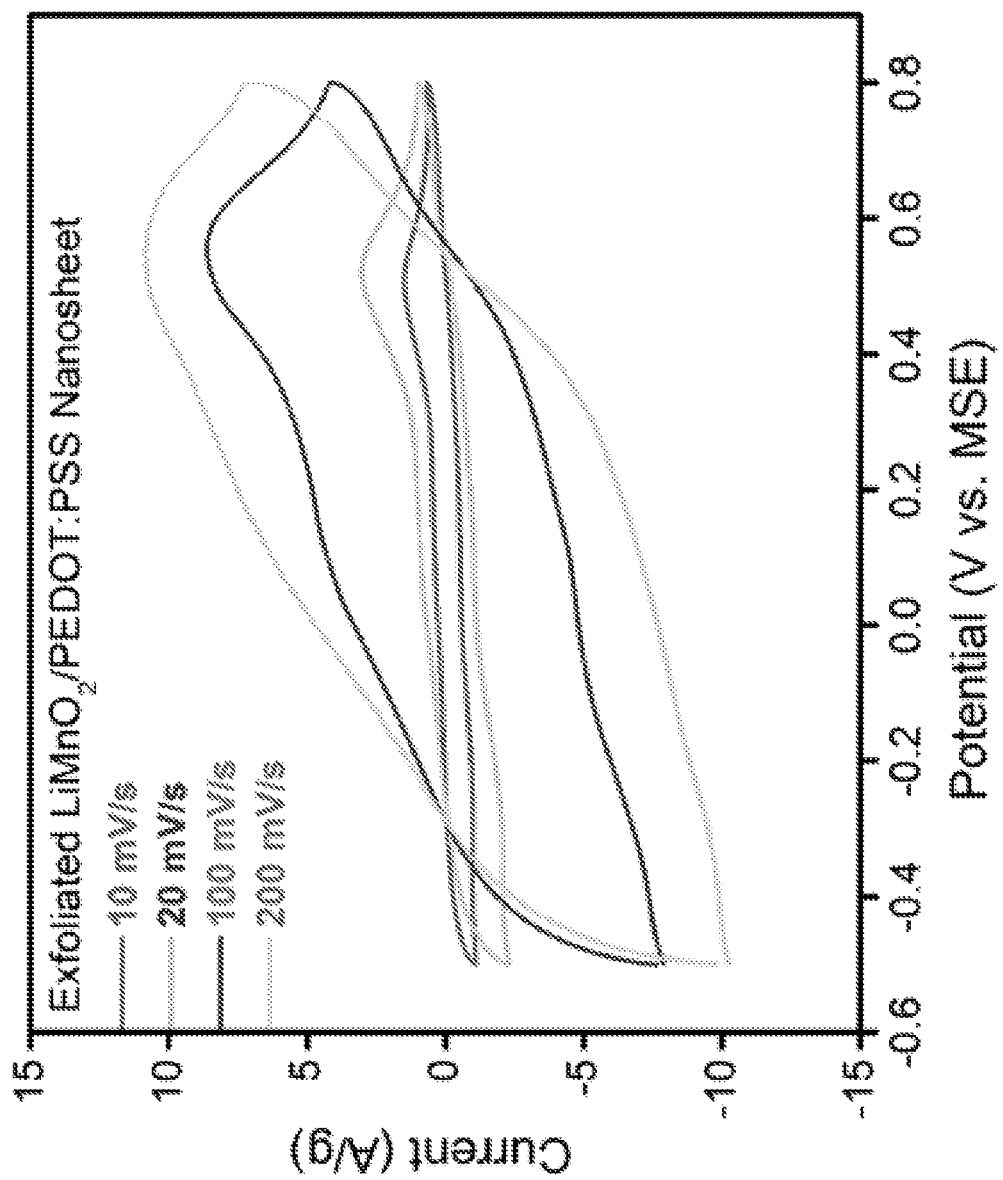
FIG. 8 shows cyclic voltammetry measurements of intercalative $LiMnO_2$/PEDOT:PSS nanosheet.

The intercalative $V_2O_5$-PEDOT:PSS nanocomposite showed an increase in capacitance as compared to a mixture of the $V_2O_5$ and PEDOT:PSS (FIG. 5B). The capacity of 160 mAh/g at a scan rate of 10 mV/s is among the best reported K-ion electrochemical storage using aqueous electrolytes.

Figure 9:
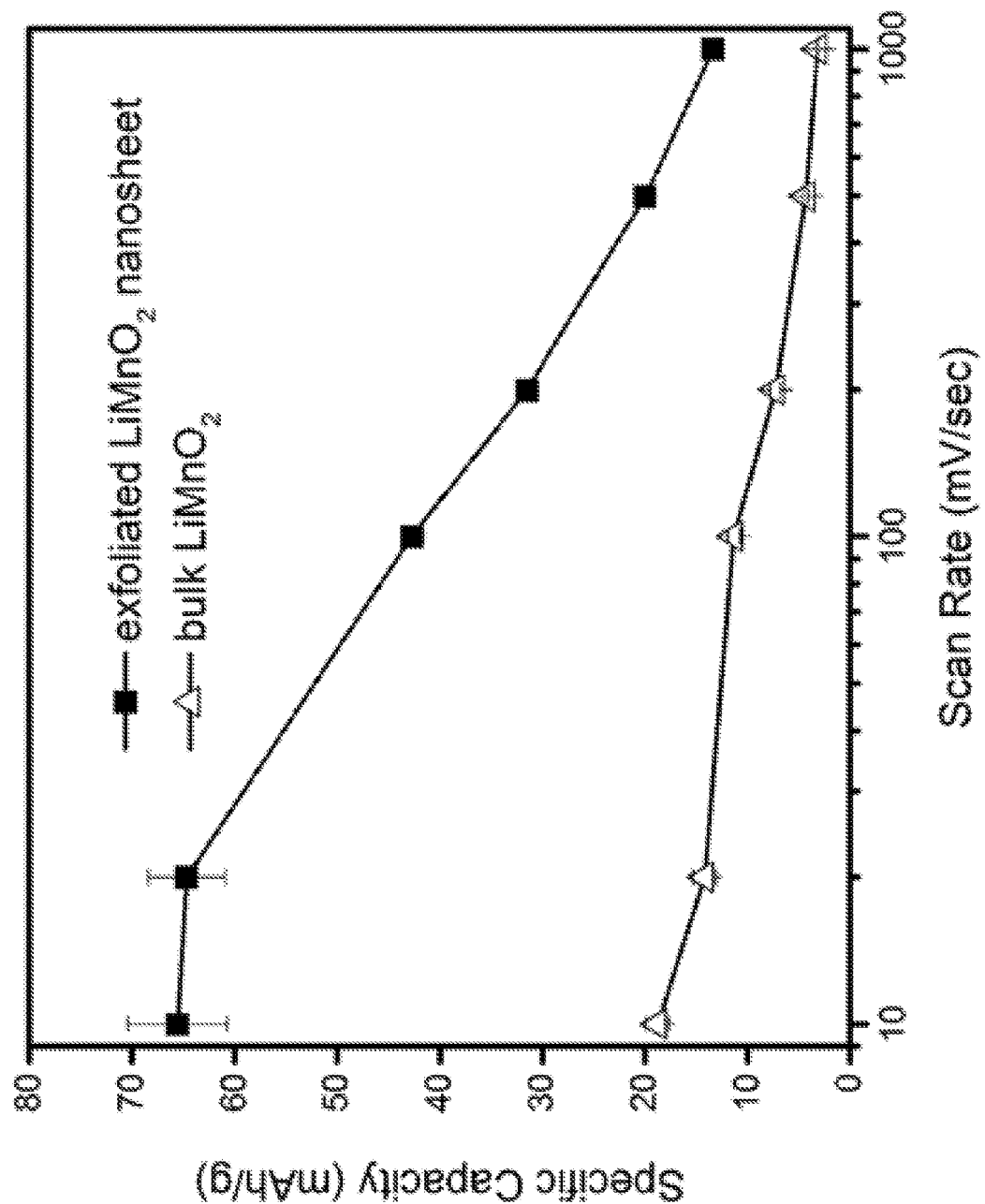
FIG. 9 shows a comparison of specific capacity toward K-ion electrochemical storage of intercalative $LiMnO_2$/PEDOT:PSS nanosheets and bulk $LiMnO_2$ materials where intercalative nanosheets show at least three times higher capacity.

As shown in FIG. 5B, over the scan rate of 10 mV/s the intercalative $V_2O_5$-PEDOT:PSS nanocomposite indicates a capacity of greater than 75 mAh/g, or in the range of 75 MAh/g to 160 mAh/g. The redox features remain visible though all scans rates tested from 10 1000 mV/s, some shoulders start to appear at higher scan rates. FIGS. 6-9 show the corresponding evaluations and comparisons of bulk $LiMnO_2$ and intercalative $LiMnO_2$/PEDOT:PSS nanosheets material prepared by the procedure herein of agitation of $LiMnO_2$ in water in the presence of PEDOT:PSS. Once again, as shown in FIG. 9, the intercalative $LiMnO_2$/PEDOT:PSS nanosheets indicate at least three times higher electrochemical storage capacity as compared to bulk and non-layered $LiMnO_2$. More specifically, as show in FIG. 9, the intercalative $LiMnO_2$/PEDOT:PSS indicates the following: (1) at a scan rate of 10-20 mV/sec, a specific capacity of greater than or equal to 60 mAh/g or in the range of 60 mAh/g to 70 mAh/g; (2) at a scan rate of 10-500 mV/sec, a specific capacity in the range of 20 mAh/g to 70 mAh/g.

Turning next to the sodium-rich manganese oxide hydrates with capacity for aqueous sodium ion electrochemical energy storage, the following is noted. Preferably, Na-rich $MnO_2$—$H_2O$ suitable for use for aqueous Na-ion storage can be made in the solid state, preferably by annealing the mixture of $Mn_3O_4$ and NaOH, involving conversion from $Mn_3O_4$ spinel to an ordered $Mn_5O_8$ layered structure and finally to Na-rich $MnO_2$—$H_2O$ driven by Na-ion insertion. The Na-rich manganese oxide hydrate herein is represented by the formula $Na_{(\delta)}MnO_x$—$H_2O$ wherein $\delta$ has a value greater than 0.17, or more preferably, in the range of >0.17 to 0.29; and x has a value in the range of 1.74 to 2.0. The reaction was confirmed by neutron total scattering measurements and pair distribution function (PDF) analysis. Storage capacity up to about 150 mA h g$^{-1}$ is observed through increase of the potential window and promotion of the redox charge transfer process towards the aqueous Na-ion storage. It should be noted that the $Mn_3O_4$ precursor is a manganese (II, III) oxide, where the valences of the Mn element are 2+ and 3+. In addition, the $Na_{(\delta)}MnO_x$—$H_2O$ is a manganese (III, IV) oxide which includes $Mn^{4+}$ and $Mn^{3+}$.

The resulting $Na_{0.29}MnO_2$—$H_2O$ material exhibits a relatively high overpotential (~0.6 V) towards oxygen and hydrogen evolution reactions and therefor enables a kinetically stable potential window of 2.5 V in the half-cell in an aqueous electrolyte without gas evolution. Moreover, the Na-rich structure improves diffusion-limited redox charge storage encouraging up to a 0.41 electron transfer reaction. Overall, the resulting $Na_{0.29}MnO_2$—$H_2O$ demonstrates a reversible capacity of about 130 to 160 mA h g$^{-1}$ (a scan rate of 5 mV s$^{-1}$ in the half-cell) in aqueous Na-ion storage, a high energy density of 20 to 30 Wh kg$^{-1}$ (a rate of 23° C. in a full-cell), and a relatively good cycling life (70 to 100 mAh g$^{-1}$ after 5000 cycles at an electric current rate of 1 A g$^{-1}$ in a full-cell).

Figure 10:
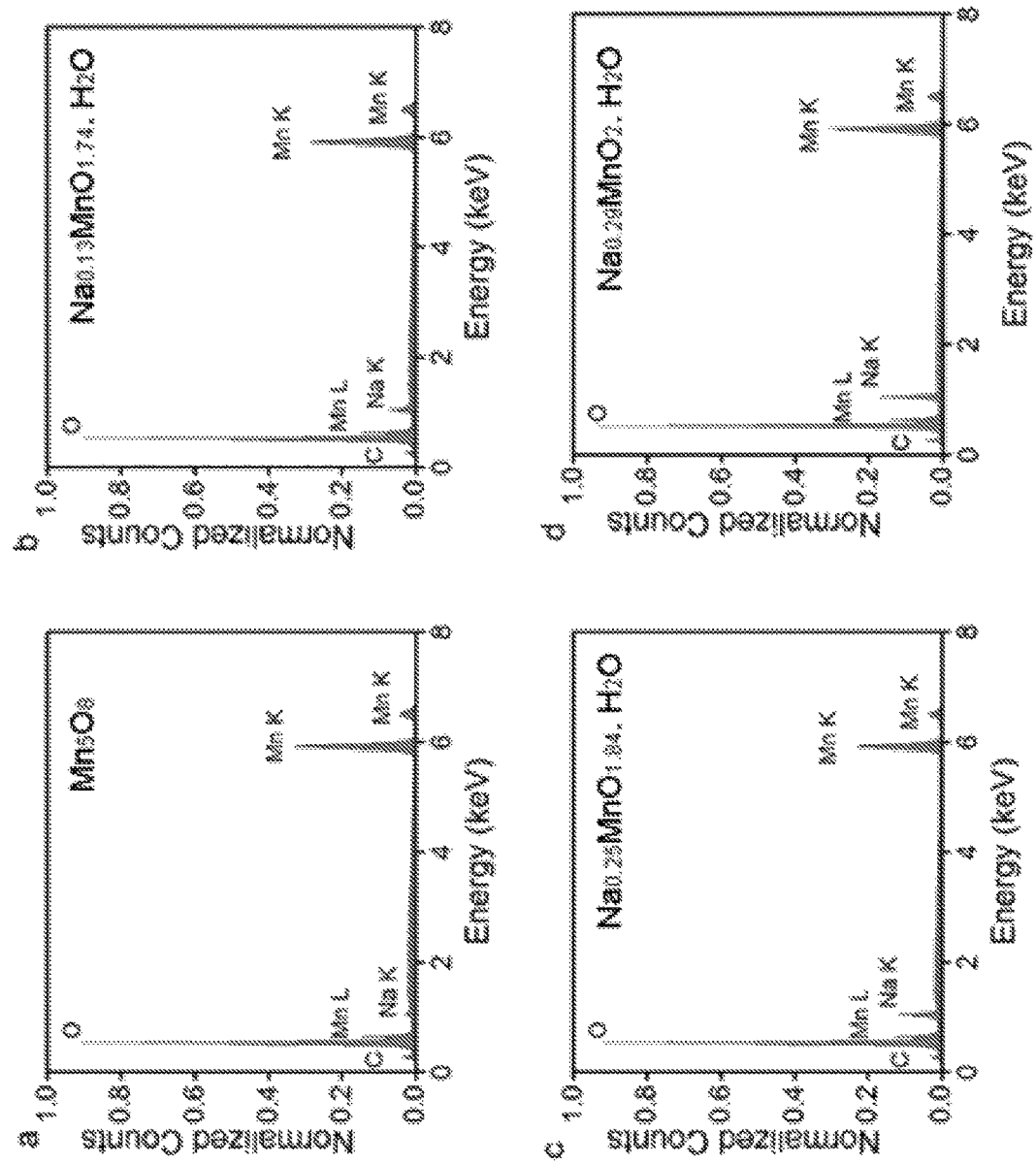
FIG. 10 shows EDS characterizations of $Na_6MnO_x$ materials with (a) $Mn_5O_8$ obtained by directly heating $Mn_3O_4$ nanoparticles, (b) $N_{0.13}MnO_{1.74}$—$H_2O$, (c) $Na_{0.25}MnO_{1.84}$—$H_2O$, and (d) $Na_{0.29}MnO_2$—$H_2O$ obtained by the thermal solid-state reactions of NaOH and $Mn_3O_4$ as the molar ratios of 0.5:1, 1:1, 2:1, respectively.
Figure 11:
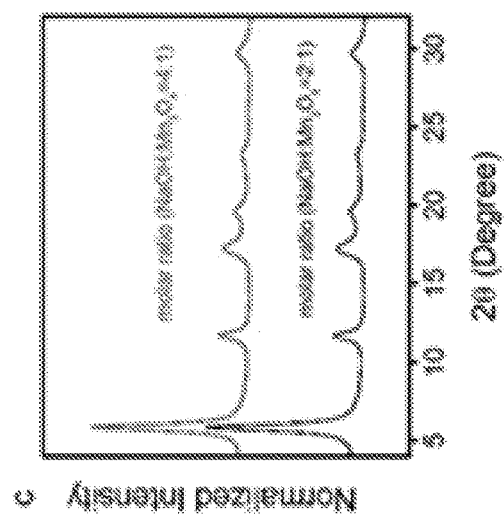
FIG. 11 shows (a) EDS characterization of $Na_{(\delta)}MnO_x$—$H_2O$ ($Na_{0.13}MnO_{1.74}$—$H_2O$; $Na_{0.25}MnO_{1.84}$—$H_2O$ and $Na_{0.29}MnO_2$—$H_2O$) materials obtained by the thermal solid-state reaction of NaOH and $Mn_3O_4$ as a molar ratio of 4:1; (b) the summaried atomic ratios of sodium to manganese for various $Na_\delta MnO_x$—$H_2O$ materials; and (c) XRD patterns of $Na_{0.29}MnO_2$—$H_2O$ materials synthesized via solid state reaction of NaOH:$Mn_3O_4$ as molar ratios of 2:1 and 4:1, indicating the forming of a stable $Na_{0.29}MnO_2$ material even with an increased amount of NaOH precursor.
Figure 11:
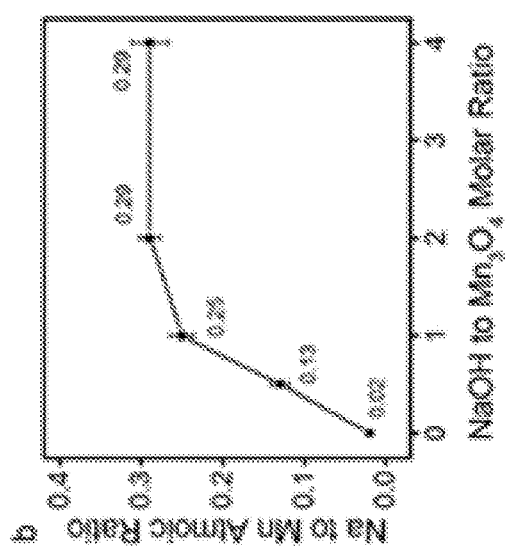
Figure 11:
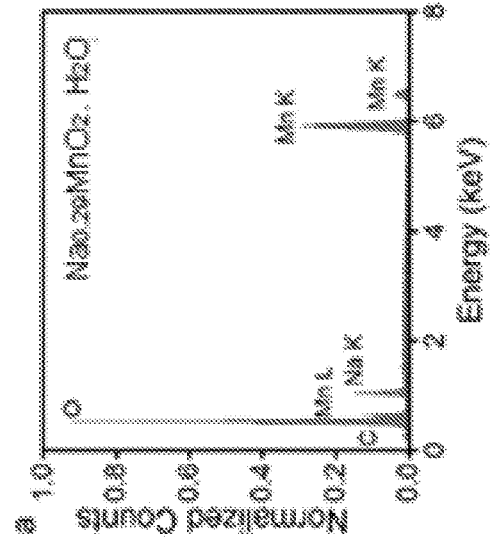
Figure 12:
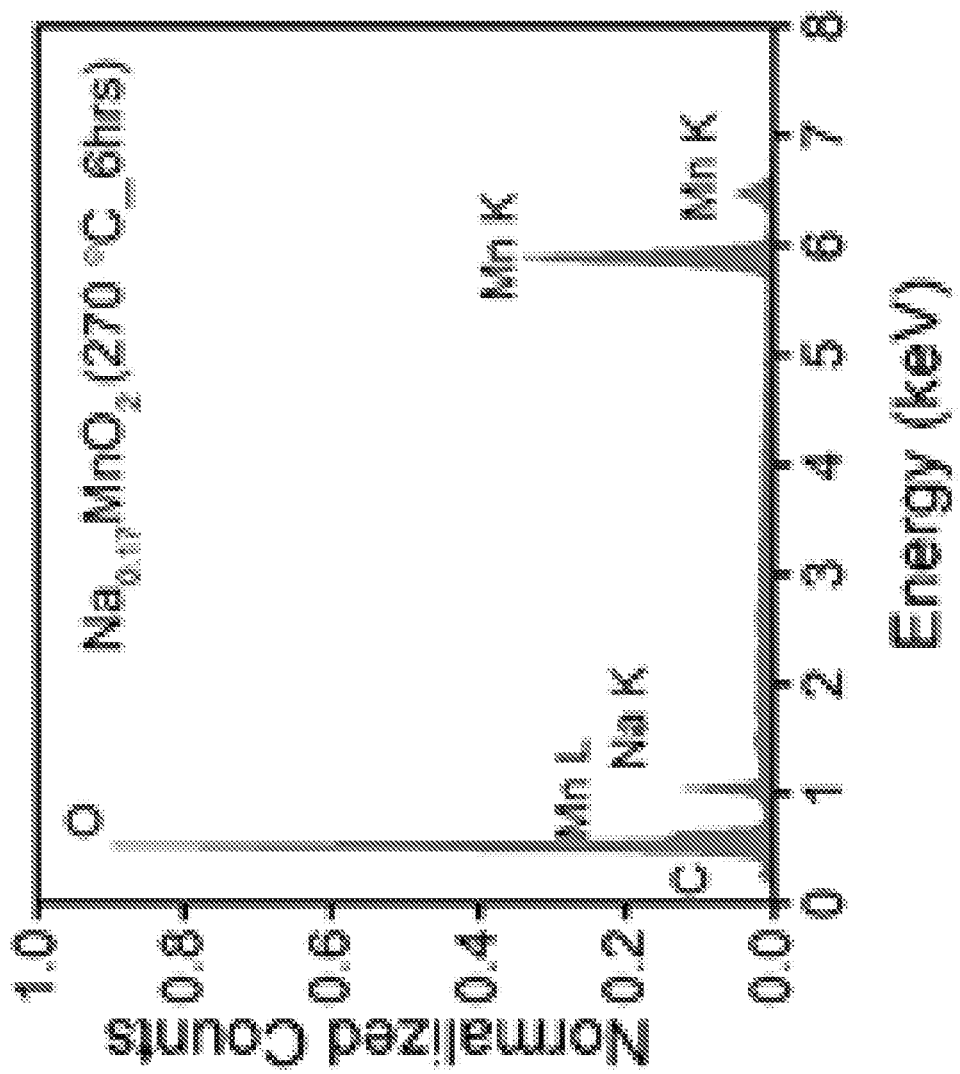
FIG. 12 shows EDS characterization of $Na_\delta MnO_2$—$H_2O$ birnessite synthesized via the wet chemistry method showing the Na/Mn atomic is 0.17:1 with the comparison to that of other works in Table 1.
Figure 22:
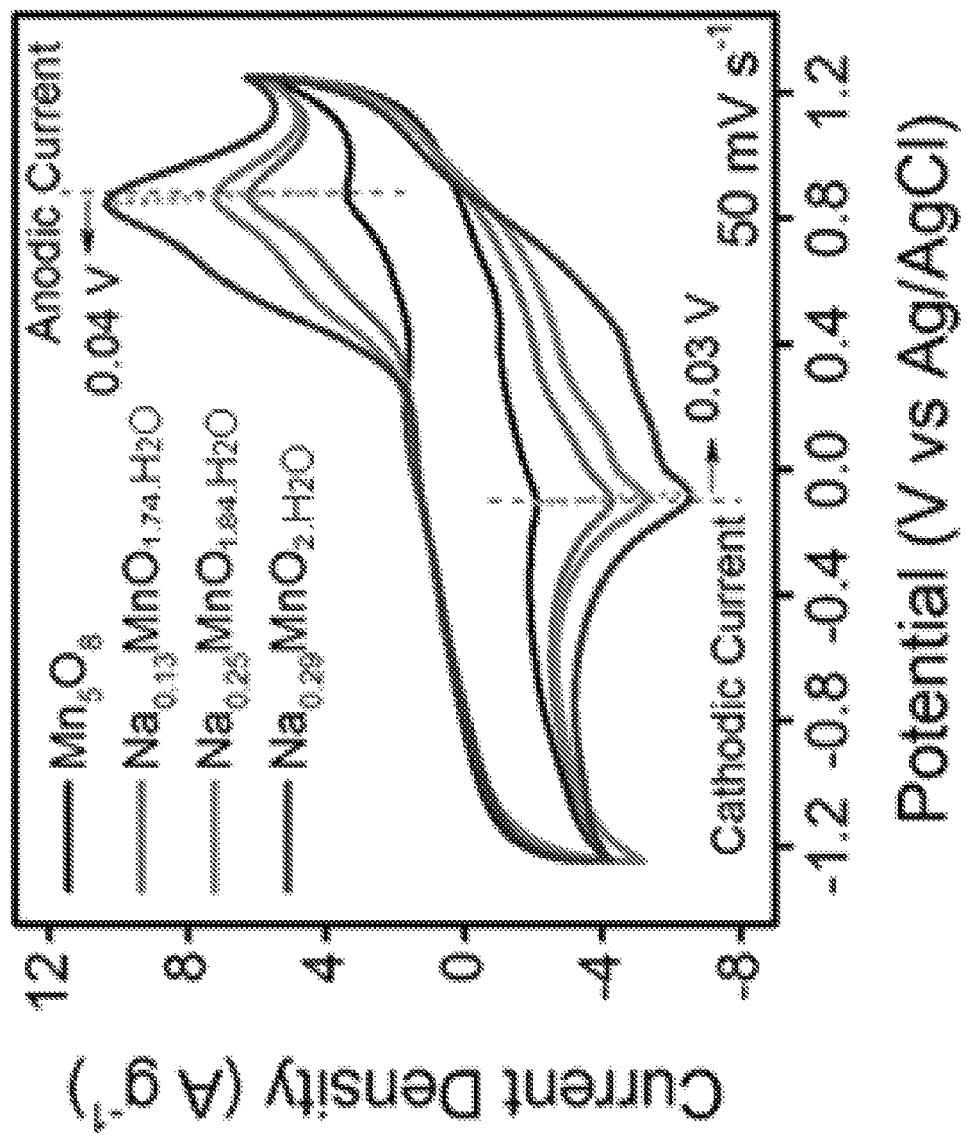
FIG. 22 shows CVs of sodium-manganese oxides at the scan rate of 50 mV s$^{-1}$, showing the anodic peak of $Na_{0.29}MnO_2$—$H_2O$ shifted to a lower potential and the cathodic peak shifted to a higher potential compared with those of other materials as the Na concentration increased.
Figure 23:
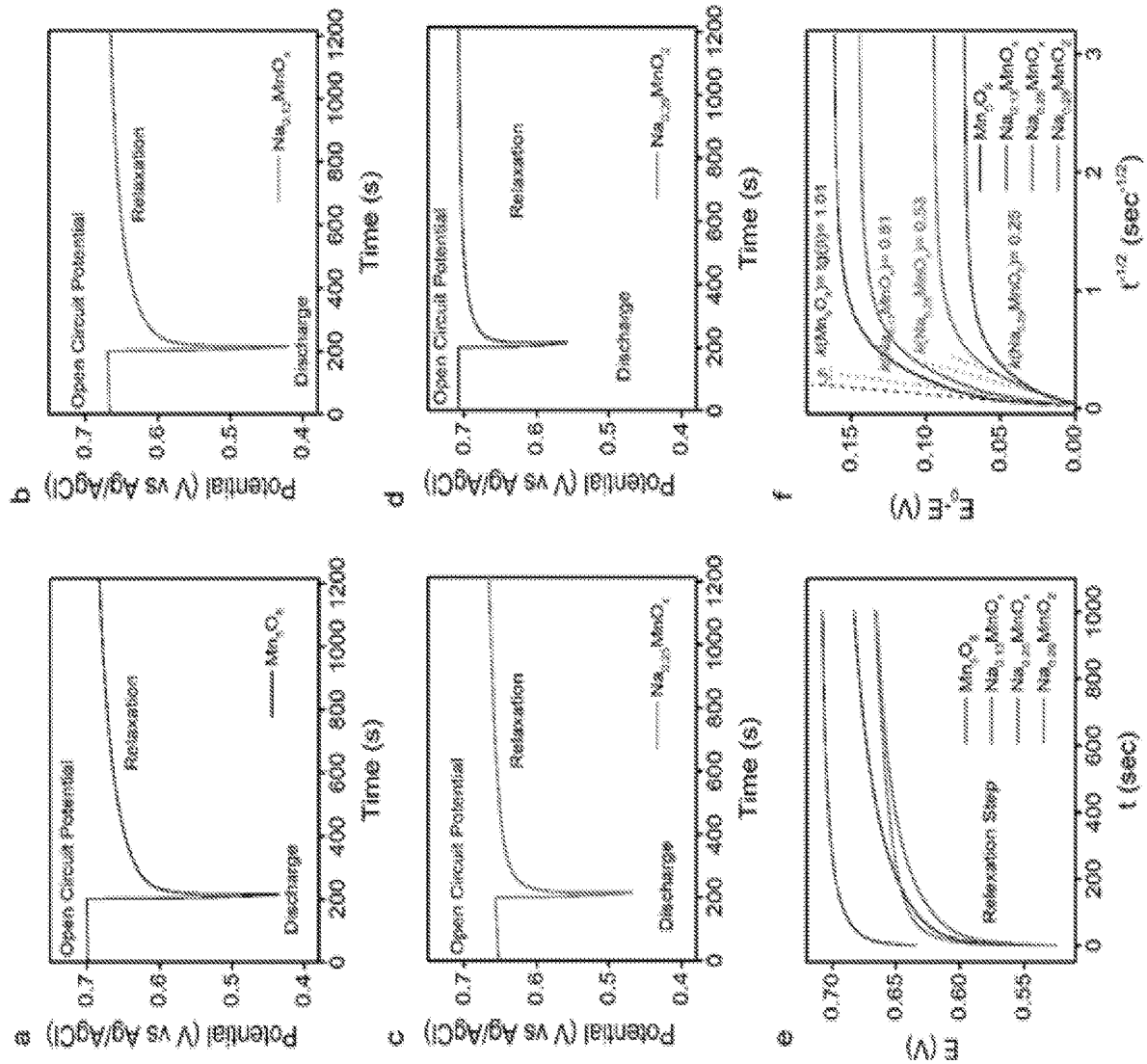
FIG. 23 shows diffusivity measurements of $Na_\delta MnO_x$ materials with (a) $Mn_5O_8$, (b) $Na_{0.13}MnO_{1.74}$—$H_2O$, (c) $Na_{0.25}MnO_{1.84}$—$H_2O$, (d) $Na_{0.29}MnO_2$—$H_2O$, (e) the relaxation steps of $Na_\delta MnO_x$ materials and (f) ($E_0$-E) as a function of $(1/t^{1/2})$ curves for the slope calculations, where $E_0$ is the open circuit voltage.

Different from wet chemistry methods involving the oxidation of $Mn^{2+}$ or reduction of permanganate at room temperature, $Na_{(\delta)}MnO_x$—$H_2O$ materials ($Na_{0.13}MnO_{1.74}$—$H_2O$; $Na_{0.25}MnO_{1.84}$—$H_2O$ and $Na_{0.29}MnO_2$—$H_2O$) were preferably prepared at 270° C. in the air via a solid-state reaction between NaOH and $Mn_3O_4$ nanoparticles, followed by water rinsing. The temperature range for the solid state reaction may fall in the range of 200° C. to 400° C., more preferably 250° C. to 300° C. The $Mn_3O_4$ nanoparticles may have a size range of 10 to 30 nm. By altering the molar ratios between NaOH and $Mn_3O_4$ from 0 to 2, various sodium manganese oxides ($Na_{0.13}MnO_{1.74}$—$H_2O$; $Na_{0.25}MnO_{1.84}$—$H_2O$ and $Na_{0.29}MnO_2$—$H_2O$) were prepared, verified by energy dispersive X-ray spectroscopy (EDS) measurement (FIG. 10). Atomic ratios of Na/Mn remained the maximum value of 0.29 when the ratio of NaOH:$Mn_3O_4$ increased to 4:1 (FIG. 11). Such a high Na/Mn ratio of 0.29 can only be achieved via the solid-state annealing, while birnessite made via a wet chemistry approach has a Na/Mn ratio of 0.17 (FIG. 12, Table 1). The morphology of $Na_{(\delta)}MnO_x$—$H_2O$ materials evolved from faceted nanoparticles, to a mixture of layers and particles, and finally to a complete layered structure with a planar dimension up to 200 nm, when the Na concentration ($\delta$) increased from 0 to 0.29 (FIGS. 22a & 23).

Figure 13:
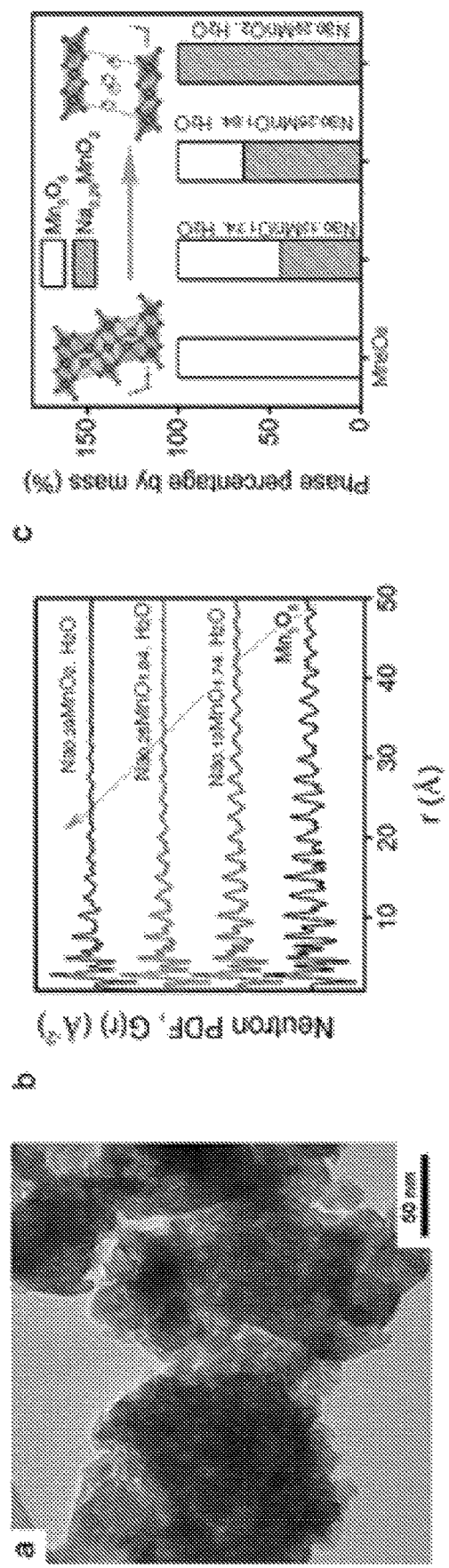
FIG. 13 shows (a) TEM image of of $Na_{0.29}MnO_2.H_2O$ materials; (b) Experimental neutron PDFs of $Na_6MnO_x$—$H_2O$ materials, where coherent lengths of the materials decreased as the Na concentration increased; (c) Phase percentage of $Na_{0.29}MnO_2$—$H_2O$ in $Na_\delta MnO_x.H_2O$ materials obtained from neutron PDF analysis.
Figure 14:
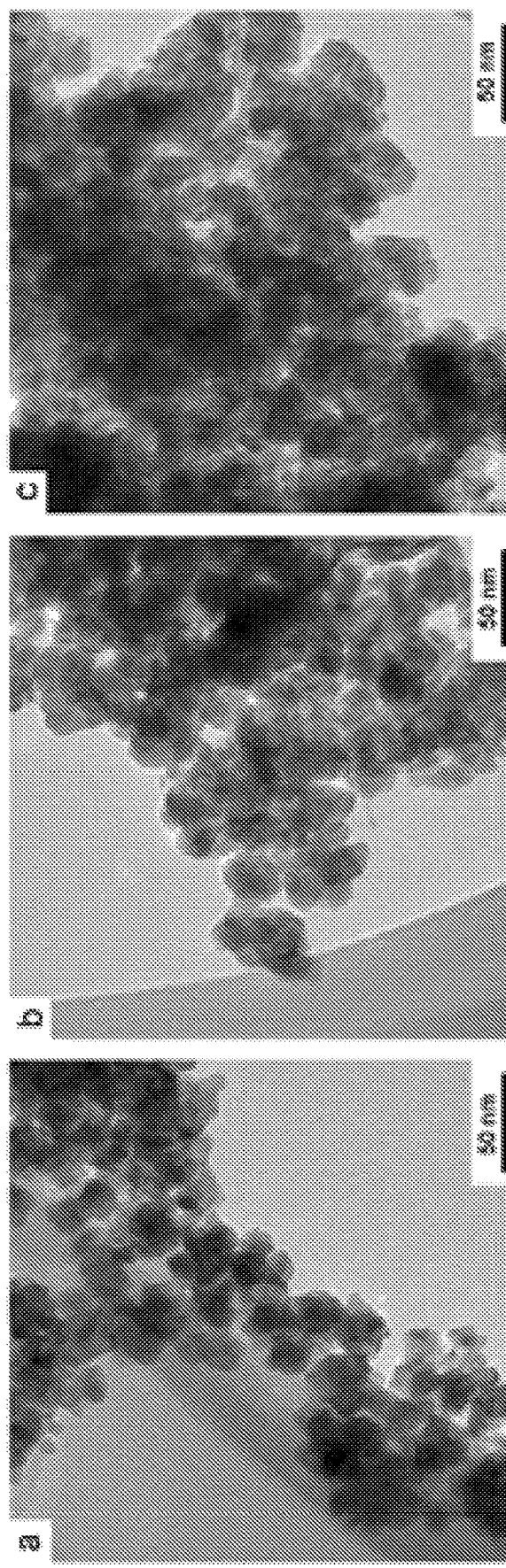
FIG. 14 shows TEM characterizations of $Na_\delta MnO_x$—$H_2O$ materials with (a) $Mn_5O_8$, (b) $Na_{0.13}MnO_{1.74}$—$H_2O$, (c) $Na_{0.25}MnO_{1.84}$—$H_2O$.
Figure 15:
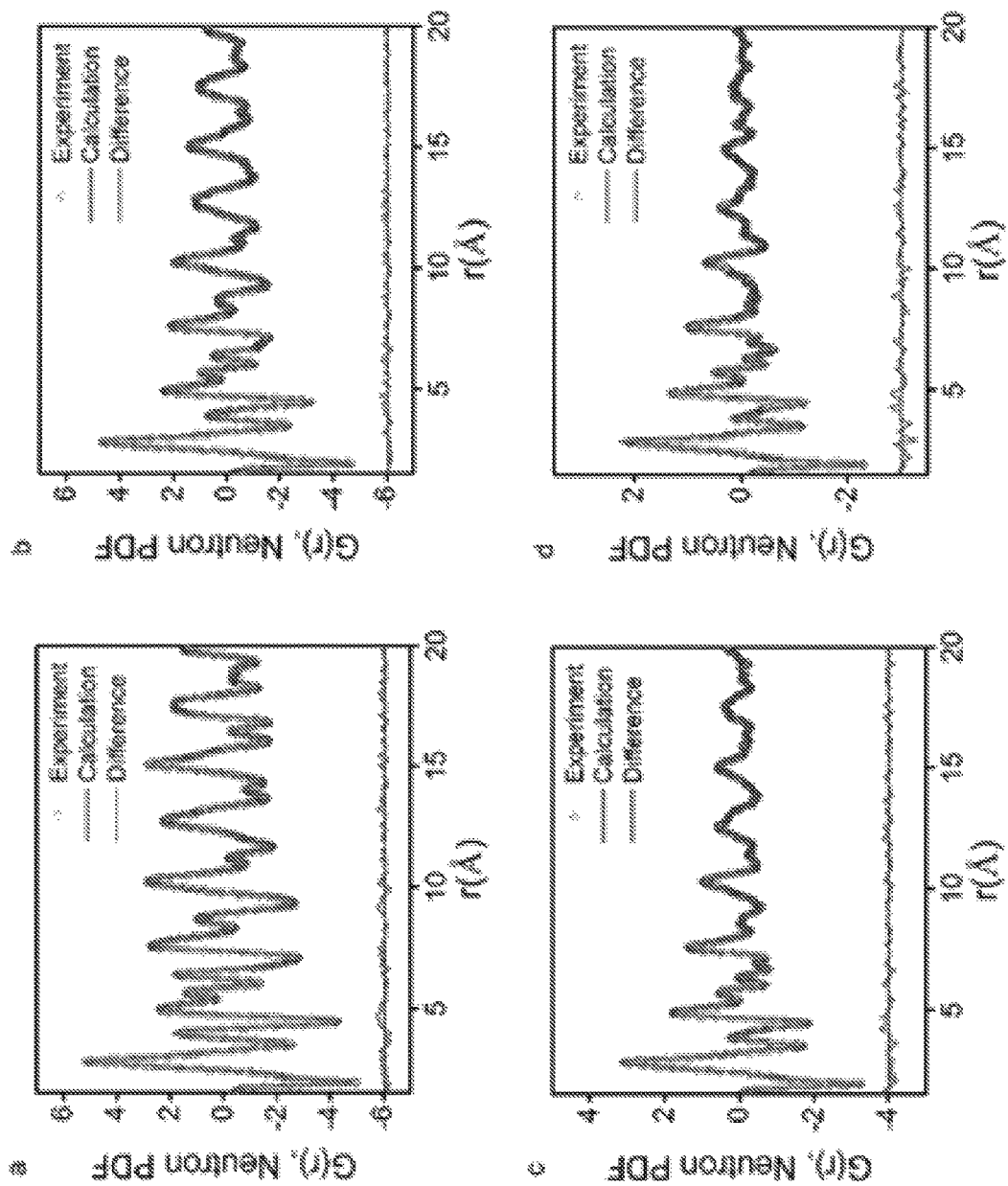
FIG. 15 shows neutron PDF analysis of (a) $Mn_5O_8$, (b) $Na_{0.13}MnO_{1.74}.H_2O$, (c) $Na_{0.25}MnO_{1.84}.H_2O$ and (d) $Na_{0.29}MnO_2$—$H_2O$ materials.
Figure 16:
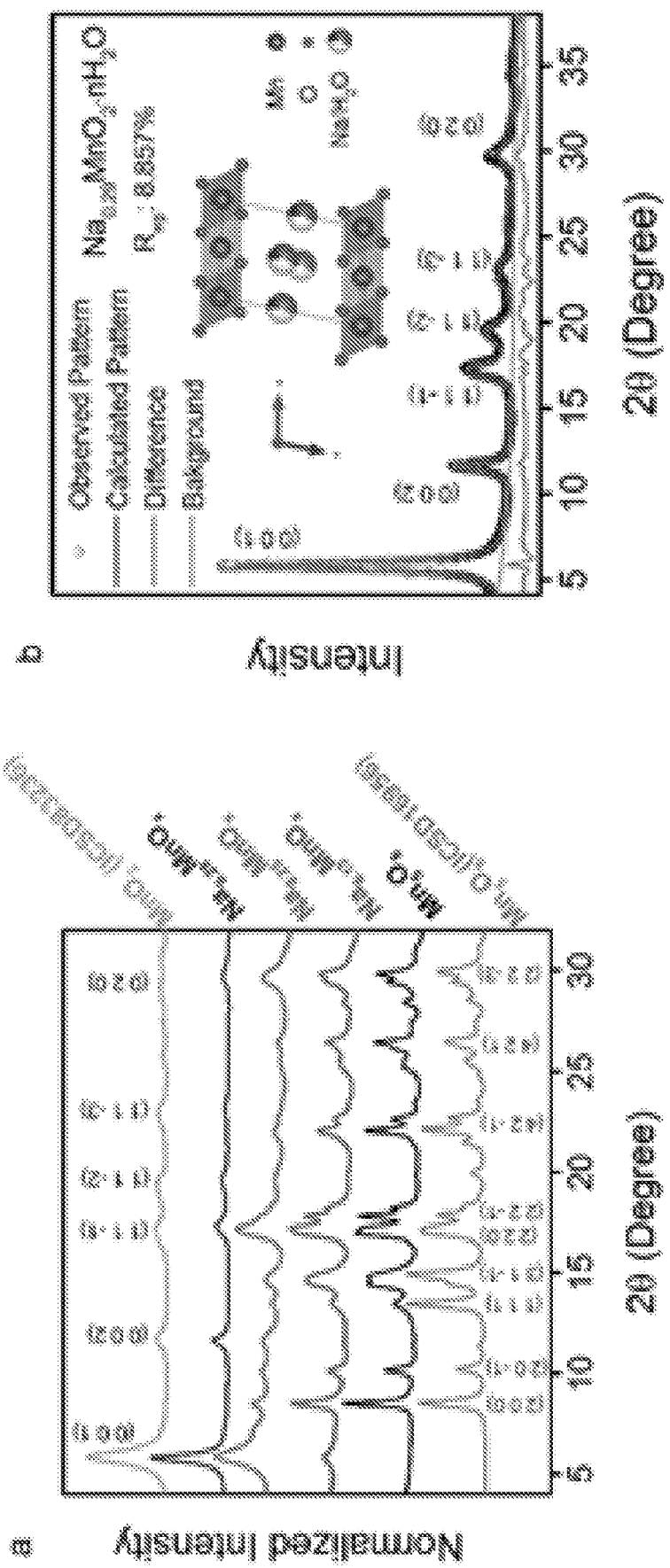
FIG. 16 shows XRD patterns of $Na_\delta MnO_x$ materials compared with $Mn_5O_8$ and $MnO_2$ standards indicating the structural evolution from $Mn_5O_8$ to $MnO_2$ as sodium concentrations increased, and the Rietveld refinement analyese of XRD pattern of $Na_{0.29}MnO_2$—$H_2O$.

FIG. 13b shows the PDF data for various $Na_{(\delta)}MnO_x$—$H_2O$ materials ($Na_{0.13}MnO_{1.74}$-$H_2O$; $Na_{0.25}MnO_{1.84}$—$H_2O$ and $Na_{0.29}MnO_2$—$H_2O$) obtained from neutron total scattering measurements. The lattice parameters obtained after refinement were shown in FIG. 15 and Tables 2-5. Unlike Rietveld refinement that only analyzes the Bragg scattering (FIG. 16), the PDF analyzes both Bragg and diffusive scattering and provided details on crystalline structure and the structural deviations from perfect crystallinity such as defects, mismatch or disorder of the materials in atomic scale. The peak of atomic pair in PDF vanished at a distance longer than the longest interatomic distance of the materials (coherent length), which decreased from >50 Å to ~30 Å as $\delta$ increases from 0 to 0.29 (FIG. 13b). The results demonstrated that crystalline order in $Na_{67}MnO_x$ becomes more confined as $\delta$ increased. Namely, $Na_\delta MnOx$-$H_2O$ with high concentration of sodium cannot sustain long-range crystallinity and became disordered. Reference to long-range crystallinity is reference to order of greater than 5.0 nm (i.e. the position of the atoms repeat in lattice space in a regular array). Accordingly, in the context of the present disclosure, disordered $Na_{(\delta)}MnO_x$—$H_2O$ may be understood as having crystalline order only up to 3.0 nm and ordered is to be understood as having crystalline order greater than 5 nm. See FIG. 13b.

FIG. 13c shows that as Na concentration ($\delta$) changed, $Na_{(\delta)}MnO_x$—$H_2O$ ($Na_{0.13}MnO_{1.74}$—$H_2O$; $Na_{0.25}MnO_{1.84}$—$H_2O$ and $Na_{0.29}MnO_2$—$H_2O$) showed pure phase $Mn_5O_8$ ($\delta$=0), mixture of $Mn_5O_8$ and layered $MnO_2$ ($\delta$=0.13 and 0.25). When $\delta$ reached 0.29, a pure triclinic birnessite structure formed with a chemical formula of $Na_{0.29(\delta)}MnO_2$—$H_2O$, where the Na cations and water molecules occupied the interlayer regions of edge-sharing [$MnO_6$] octahedra with an interplanar distance of 7.14 Å.

Figure 17:
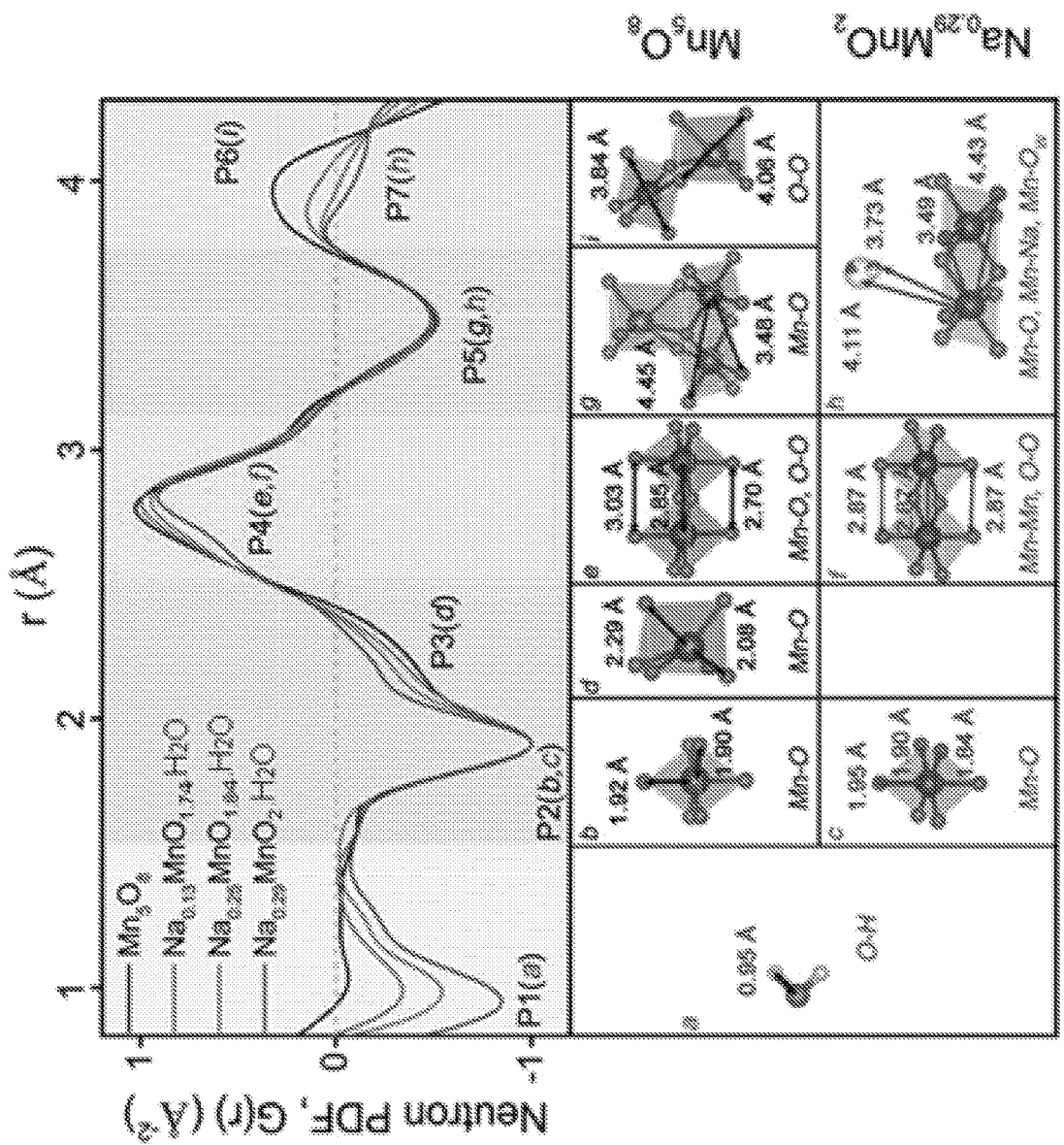
FIG. 17 shows neutron PDFs of $Na_\delta MnO_x$ materials normalized by the intensity of the peak at 1.9 Å associated with Mn—O pair. The atom pair associated with each peak (P1 to P7) can be attributed to (a) water, (b, d, e, g, i) $Mn_5O_8$ polyhedra in black and (c, f, h) $MnO_2$ polyhedra in blue.

FIG. 17 shows the PDF in the range from 0.8 to 4.3 Å, revealing a phase transition from $Mn_5O_8$, to a mixture of $Mn_5O_8$ and $MnO_2$ birnessite and finally to $MnO_2$ birnessite as $\delta$ increased. The peaks of PDF can be indexed as O—H pair at 0.95 Å (P1) from water (a), Mn—O pairs around 1.9 Å (P2) from the [$MnO_6$] octahedral unit and 2.2 Å (P3) from Mn atoms in prismatic sites relative to O, Mn—Mn or O—O pair around 2.8 Å (P4), and Mn—O pair around 3.5 Å (P5) from the nearest neighbors of [$MnO_6$] octahedral units. It is notable that O—H pair (P1) and Mn—O pairs (P2, P3, P5 and P7) showed negative peaks due to negative coherent neutron scattering lengths of H and Mn atoms (−3.74 femtometer and −3.73 femtometer, respectively). The Mn—O pair around 1.9 Å (P2) is attributed to $Mn_5O_8$ (b) and layered $Na_{0.29}MnO_2$ (c), respectively. The Mn—O pair around 2.2 Å (P3) is attributed to Mn(II)-O from $Mn_5O_8$ phase (d), which decreased relatively to Mn(IV)-O pair at P2 as $\delta$ increased, congruent with the decreasing phase fractions of $Mn_5O_8$. The positive peaks at 2.8 Å (P4) is attributed to Mn—Mn or O—O bonding from adjacent [$MnO_6$] octahedral units in $Mn_5O_8$ (e) and $Na_{0.29}MnO_2$ (f) phases. Therefore, as δ increased the intensity of the PDF peaks at 2.8 Å of each material did not change significantly relatively to Mn(IV)-O pair. Similar trends can be found in Mn—O pair at 3.5 Å (P5) from adjacent [MnO$_6$] in Mn$_5$O$_8$ (g) and Na$_{0.29}$MnO$_2$ phases (h). The peaks at ~4.0 Å (P6 and P7) showed a rather interesting transition from positive to negative direction as δ increased. The positive peak at 3.96 Å (P6) related to O—O pair (i) in Mn$_5$O$_8$ either within the same [Mn(IV)O$_6$] octahedral unit or [Mn(II)-O] units where Mn$^{2+}$ located in the trigonal prismatic site. In contrast, negative peak at 4.0 Å (P7) is attributed to Mn—Na pair at 4.11 Å (h) from the interaction between Na-ion at the interlayer and Mn$^{4+}$ from [MnO$_6$] octahedral unit or Mn—O pair at 3.73 Å (h) from the interaction between H$_2$O at the interlayer and Mn$^{4+}$, both from Na$_{0.29}$MnO$_2$ layered phase. The interplay, between negative peaks of Mn—Na and Mn—O$_w$ pairs (O$_w$ from interlayer H$_2$O) in Na$_{0.29}$MnO$_2$ phase and positive peak of O—O pair from Mn$_5$O$_8$ phase at around 4.0 Å, explained the overall peak changed from positive to negative direction when δ increased, again reflecting the phase transition from Mn$_5$O$_8$ to Na$_{0.29}$MnO$_2$ birnessite driven by the Na-ion insertion during the solid-state annealing.

Figure 18:
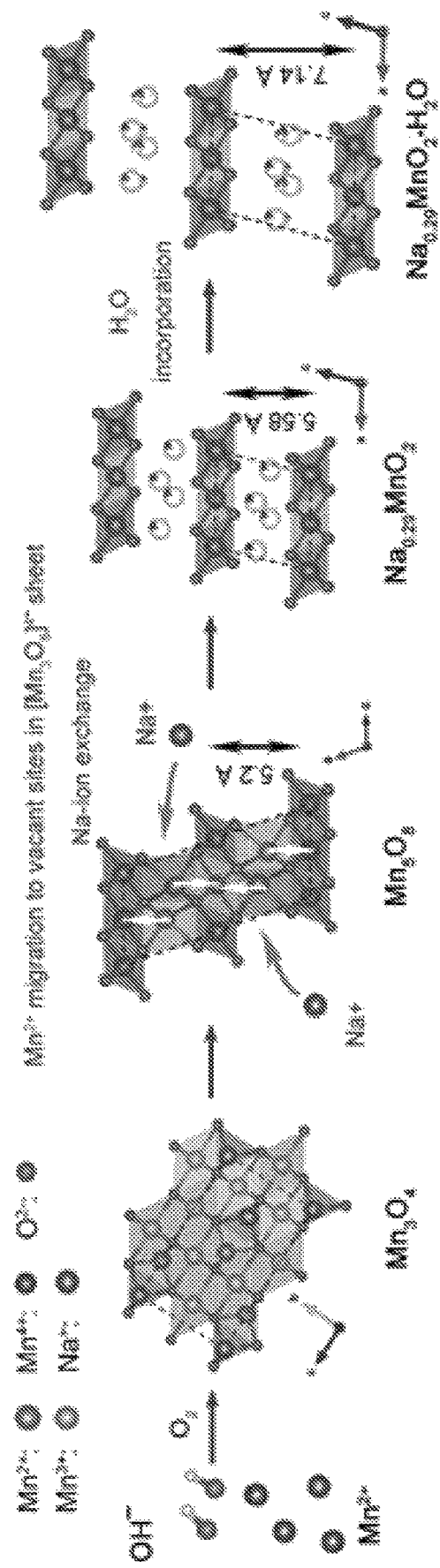
FIG. 18 shows the proposed formation mechanism for $Na_{0.29}MnO_2$—$H_2O$ driven by solid-state Na-ion intercalation in ($Mn^{2+}$: green; $Mn^{3+}$: orange; $Mn^{4+}$: purple; $Na^+$: brown; O: red).

Based on above analysis, a formation mechanism of Na$_{0.29}$MnO$_2$—H$_2$O birnessite is proposed in FIG. 18, where Mn$_3$O$_4$ was converted into Mn$_3$O$_8$ through oxidation of [Mn(III)O$_6$] octahedra of Mn$_3$O$_4$ into [Mn(IV)O$_6$] units, followed by Na-ion driven conversion from Mn$_3$O$_8$ to Na$_{0.29}$MnO$_2$—H$_2$O birnessite during thermal annealing in the air. Although Mn$_3$O$_8$ and Na$_{0.29}$MnO$_2$—H$_2$O have different crystalline structures, where the former is crystalline monoclinic and the latter is disordered triclinic, both compounds share similar structural characteristics. Mn$_3$O$_8$ has a layered structure and consists of sheets of [Mn$_3^{4+}$O$_8$]$^{4-}$ in the be plane. Each Mn$^{4+}$ atom is coordinated by six oxygen atoms and form edge-sharing octahedral unit ([MnO$_6$]). Half of the Mn$^{4+}$ sites in the main octahedral sheets are not fully occupied, above and below these vacant sites are Mn$^{2+}$ sites. Therefore, the negatively charged octahedral sheets are further neutralized and held together by Mn$^{2+}$ atoms located between layers, giving a compositional formula of Mn$^{2+}_2$Mn$^{4+}_3$O$_8$. Unlike Mn$^{4+}$ ions, Mn$^{2+}$ ions have larger radius and thus show trigonal prismatic coordination with oxygen atoms. It is apparent that the [Mn$_3^{4+}$O$_8$]$^{4-}$ sheets resemble the structure of Na$_{0.29}$MnO$_2$—H$_2$O birnessite comprised of infinite [MnO$_6$] octahedral layer with intercalated Na cations in between. The transition from Mn$_5$O$_8$ to Na$_{0.29}$MnO$_2$—H$_2$O birnessite is an equivalent process of ion-exchange of Mn$^{2+}$ ions in the Mn$_2^{2+}$Mn$_3^{4+}$O$_8$ with Na$^+$ ions in solid state.

Figure 19:
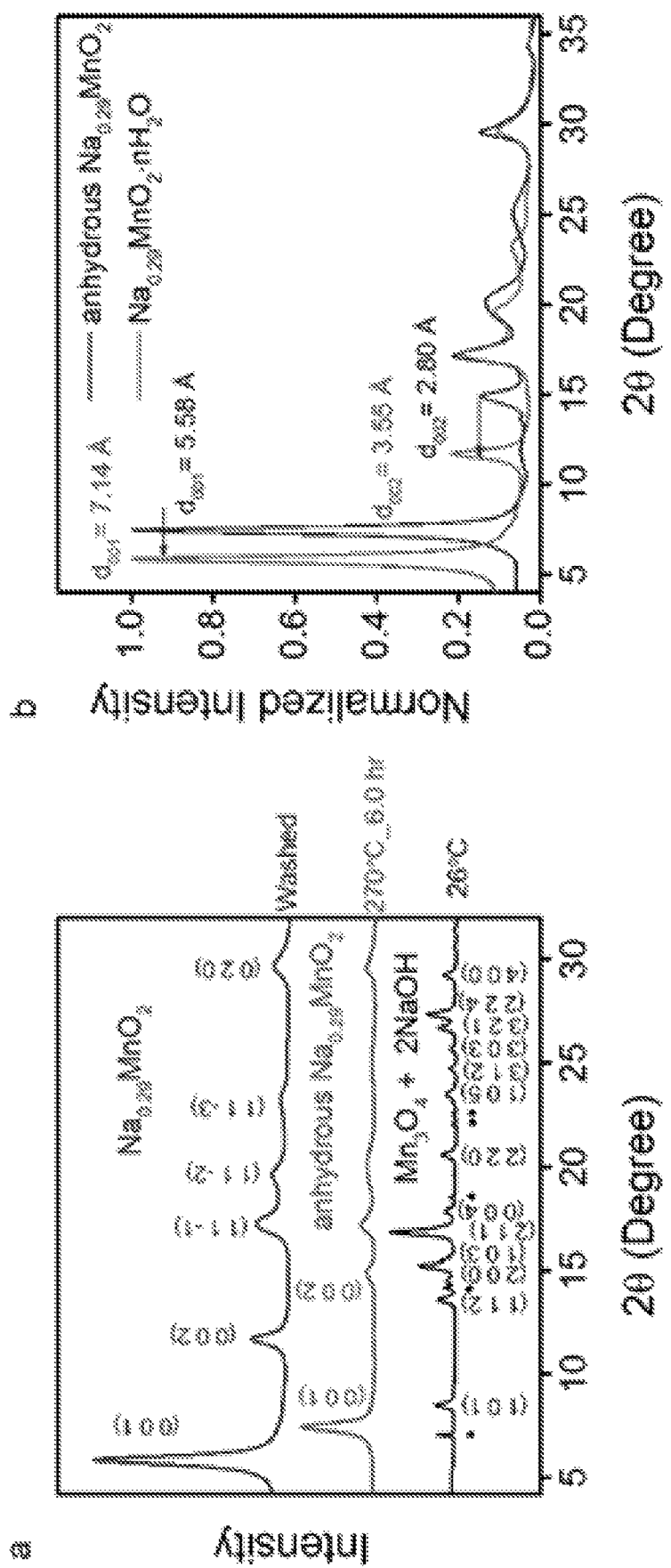
FIG. 19 shows XRD characterizations of $Na_{0.29}MnO_x$ materials with the thermal solid-state reacted $Na_{0.29}MnO_2$ and washed $Na_{0.29}MnO_2$ (the diffraction peaks from $Mn_3O_4$ are indexed in black and the black solid dot from NaOH, the resulting heated anhydrous $Na_{0.29}MnO_2$ and washed $Na_{0.29}MnO_2$—$H_2O$ are labelled as well).

Without being limited, it is believed that the Mn$^{2+}$ ions with trigonal prismatic coordination located between the interlayer of Mn$_5$O$_8$ had higher mobility than the Mn$^{4+}$ ions within octahedral coordination. Accordingly, the insertion of Na-ions into the Mn$^{2+}$ site was kinetically favored, accompanied with the migration of Mn$^{2+}$ ions into the vacant sites in [Mn$^{4+}_3$O$_8$]$^{4-}$ layers, and finally drove the formation of Na$_{0.29}$MnO$_2$. XRD showed that anhydrous Na$_{0.29}$MnO$_2$ had interlayer distance of 5.58 Å (FIG. 19), very similar to that of Mn$_5$O$_8$ (5.2 Å). Upon water intercalation, the resulting Na$_{0.29}$MnO$_2$·H$_2$O showed an increased interlayer distance of 7.14 Å. Note that the Na-ion driven conversion from Mn$_5$O$_8$ to Na$_{0.29}$MnO$_2$ disclosed herein contrasts the formation of Li—MnO$_2$ via the ion-exchange between Ca$_2$Mn$_3$O$_8$ (Ca$^{2+}_2$Mn$^{4+}_3$O$_8$), isomorphic structure of Mn$_5$O$_8$ (Mn$^{2+}_2$Mn$^{4+}_3$O$_8$), and molten lithium nitrate. In the formation of Li—MnO$_2$, Li-ions occupied all the available octahedral sites between the [Mn$_3^{4+}$O$_8$]$^{4-}$ layers rather than the trigonal prismatic sites occupied by Ca$^{2+}$ in the parent Ca$_2$Mn$_3$O$_8$ compound due to much smaller size of Li$^+$ compared with Ca$^{2+}$, resulting in the complete conversion to layered LiMnO$_2$ with R$\bar{3}$m or O3 symmetry.

Figure 20:
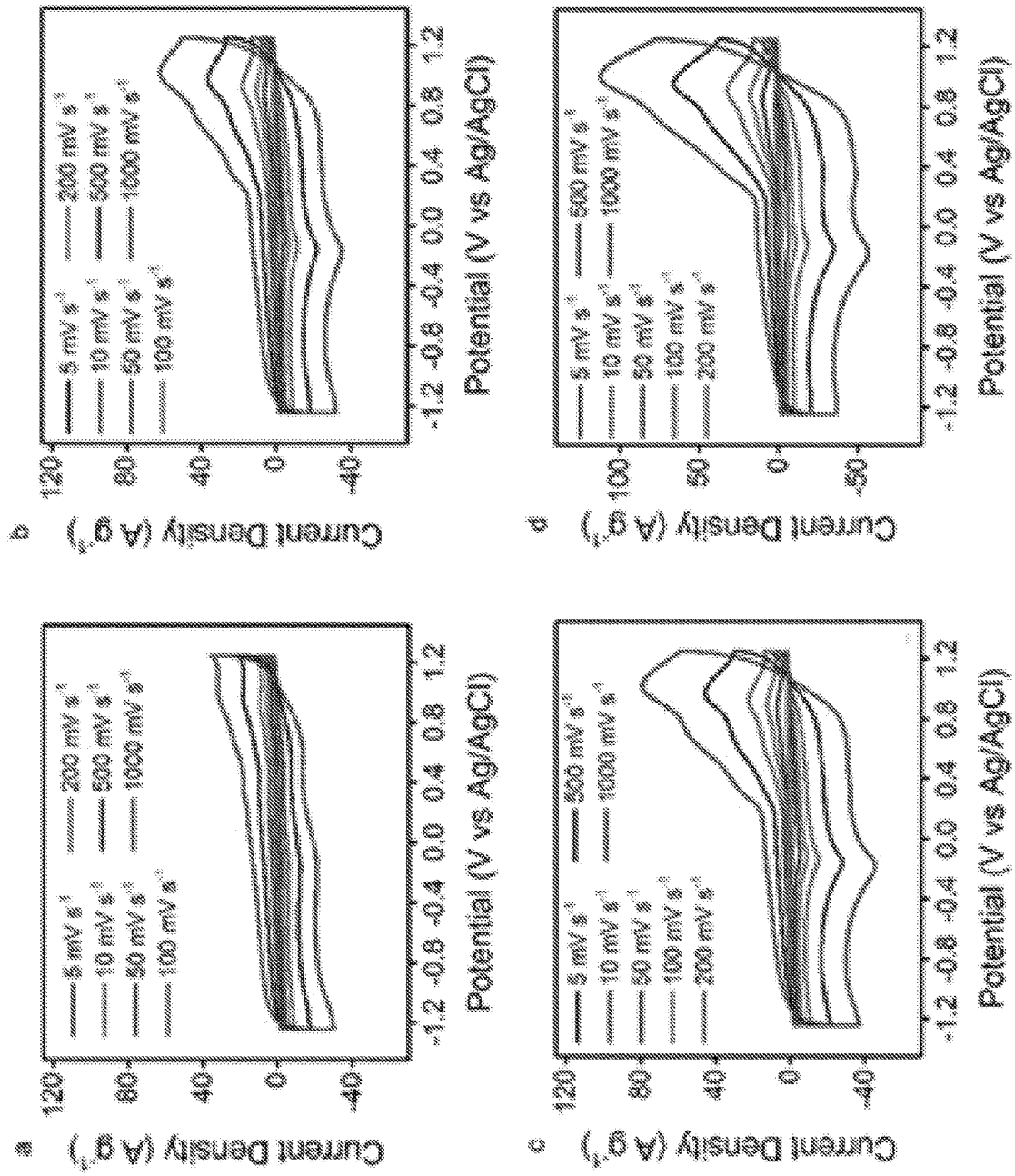
FIG. 20 shows electrochemical CV measurements in half-cells. Cyclic Voltammetry (CV) scans of (a) $Mn_5O_8$, (b) $Na_{0.13}MnO_{1.74}$—$H_2O$, (c) $Na_{0.25}MnO_{1.84}$—$H_2O$, and (d) $Na_{0.29}MnO_2$—$H_2O$ between −1.25 V to 1.25 V (vs Ag/AgCl) in 0.1 M $Na_2SO_4$ electrolyte at the scan rates from 5 to 1000 mV s$^{-1}$.
Figure 21:
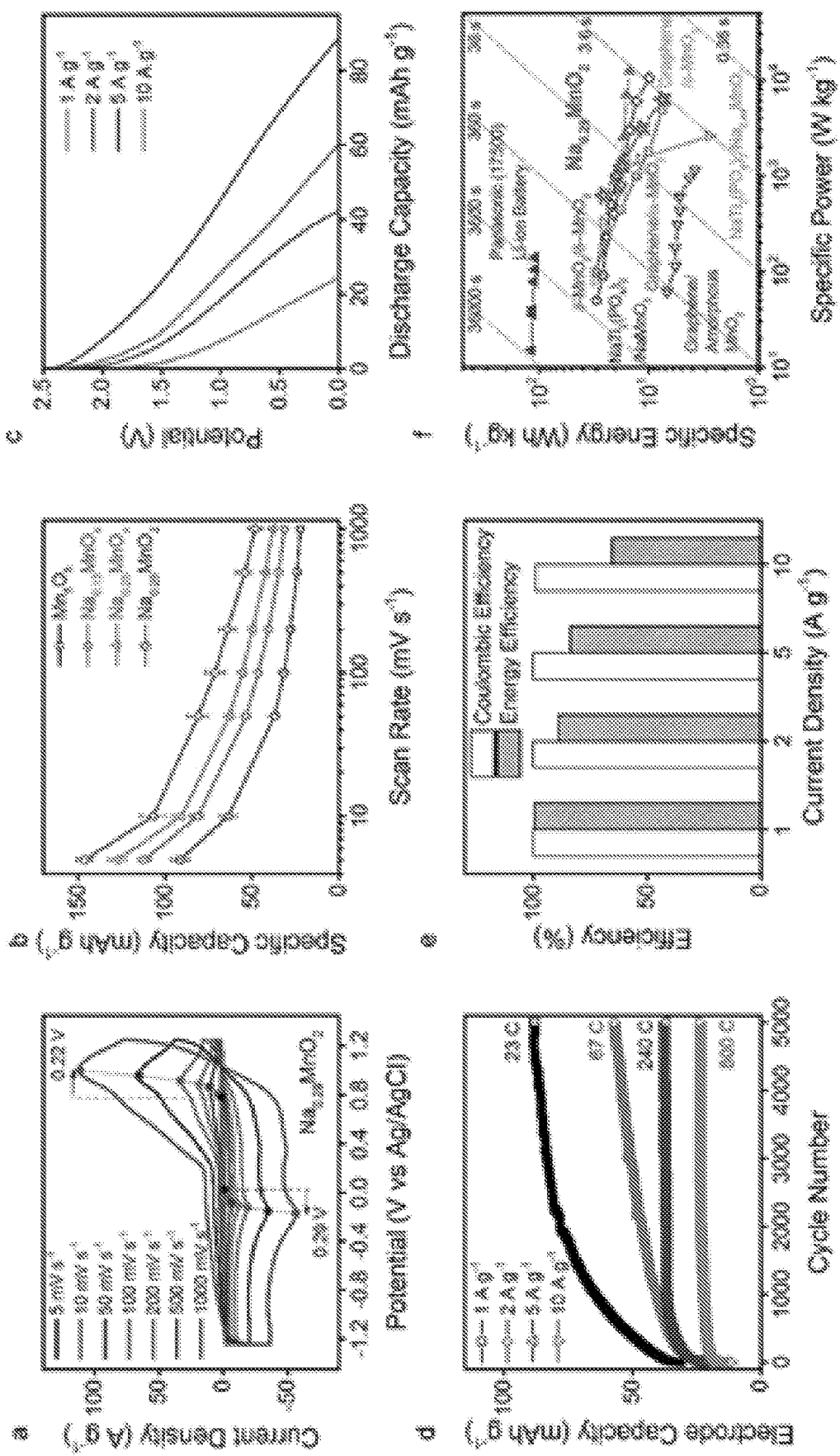
FIG. 21 shows electrochemical half-cell measurements with (a) Cyclic Voltammetry (CV) scans of $Na_{0.29}MnO_2.H_2O$ material between −1.25 V to 1.25 V (vs Ag/AgCl) at various scan rates in 0.1 M $Na_2SO_4$ electrolyte; (b) calculated specific charge storage capacities of sodium-manganese oxides as a function of scan rates; Symmetric full-cell measurements with (c) discharge electrode capacities of $Na_{0.29}MnO_2.H_2O$ material at the various current densities of 1 A g$^{-1}$, 2 A g$^{-1}$, 5 A g$^{-1}$ and 10 A g$^{-1}$ (after 5000 galvonstatic charge and discharge process unless specified otherwise); (d) electrode capacities of $Na_{0.29}MnO_2$—$H_2O$ as a function of cycle number up to 5000 at the current densities from 1 A g$^{-1}$ to 10 A g$^{-1}$; (e) coulombic and energy efficiencies of $Na_{0.29}MnO_2$—$H_2O$ at various current densities as a function of current density (1, 2, 5 and 10 A g$^{-1}$); (f) Ragone plot with gravimetric specific energy and power of the symmetric $Na_{0.29}MnO_2.H_2O$ fullcell after 5000 galvanostatic cycles. The aqueous (empty symbols) and non-aqueous (solid symbols) devices are reported, and the gravimetric specific energy and power are calculated by the mass of electrode materials except the Panasonic (17500) Li-ion batteries.

Electrochemical performance of Na$_{(\delta)}$MnO$_x$—H$_2$O were tested in a 0.1 M Na$_2$SO$_4$ electrolyte in a three-electrode half-cell using cyclic voltametry (CV) measurements between −1.25 V to 1.25 V (vs Ag/AgCl) at scan rates ranging from 5 to 1000 mV s$^{-1}$ (FIG. 20). FIG. 21*a* showed the CVs of Na$_{0.29}$MnO$_2$—H$_2$O, where distinct redox peaks can be observed at all the tested scan rates. As the scan rate increased, the anodic peaks shifts to higher potential from 0.78 V to 1.00 V, while the cathodic peaks shifted to lower potential from 0.12 V to 0.17 V. Compared with other Na$_\delta$MnO$_x$—H$_2$O materials (Na$_{0.13}$MnO$_{1.74}$—H$_2$O and Na$_{0.25}$MnO$_{1.84}$—H$_2$O), Na$_{0.29}$MnO$_2$—H$_2$O showed the least peak-shifting, indicating it has a more facilitated redox processes requiring lower overpotential for Na-ion transport (FIG. 22). In FIG. 21*b*, Na$_{0.29}$MnO$_2$—H$_2$O material showed higher specific capacities compared with other materials at all scan rates with a maximum specific capacity 147 mAh g$^{-1}$ at a scan rate of 5 mV s$^{-1}$. To further evaluate the Na-ion transport in Na$_\delta$MnO$_x$—H$_2$O materials, the diffusion coefficient was measured using a current pulse relaxation technique.[7] As shown in FIG. 23, the relative diffusion coefficients (regarding to Mn$_5$O$_8$) of Na$_{0.13}$MnO$_{1.74}$—H$_2$O, Na$_{0.25}$MnO$_{1.84}$—H$_2$O, and Na$_{0.29}$MnO$_2$—H$_2$O were 2.4, 6.6 and 38.7, demonstrating the Na-ion intercalation has less energy barrier in the Na$_{0.29}$MnO$_2$—H$_2$O electrode, congruent with CV data showing less overpotential for ionic transport for Na$_{0.29}$MnO$_2$—H$_2$O.

Figure 24:
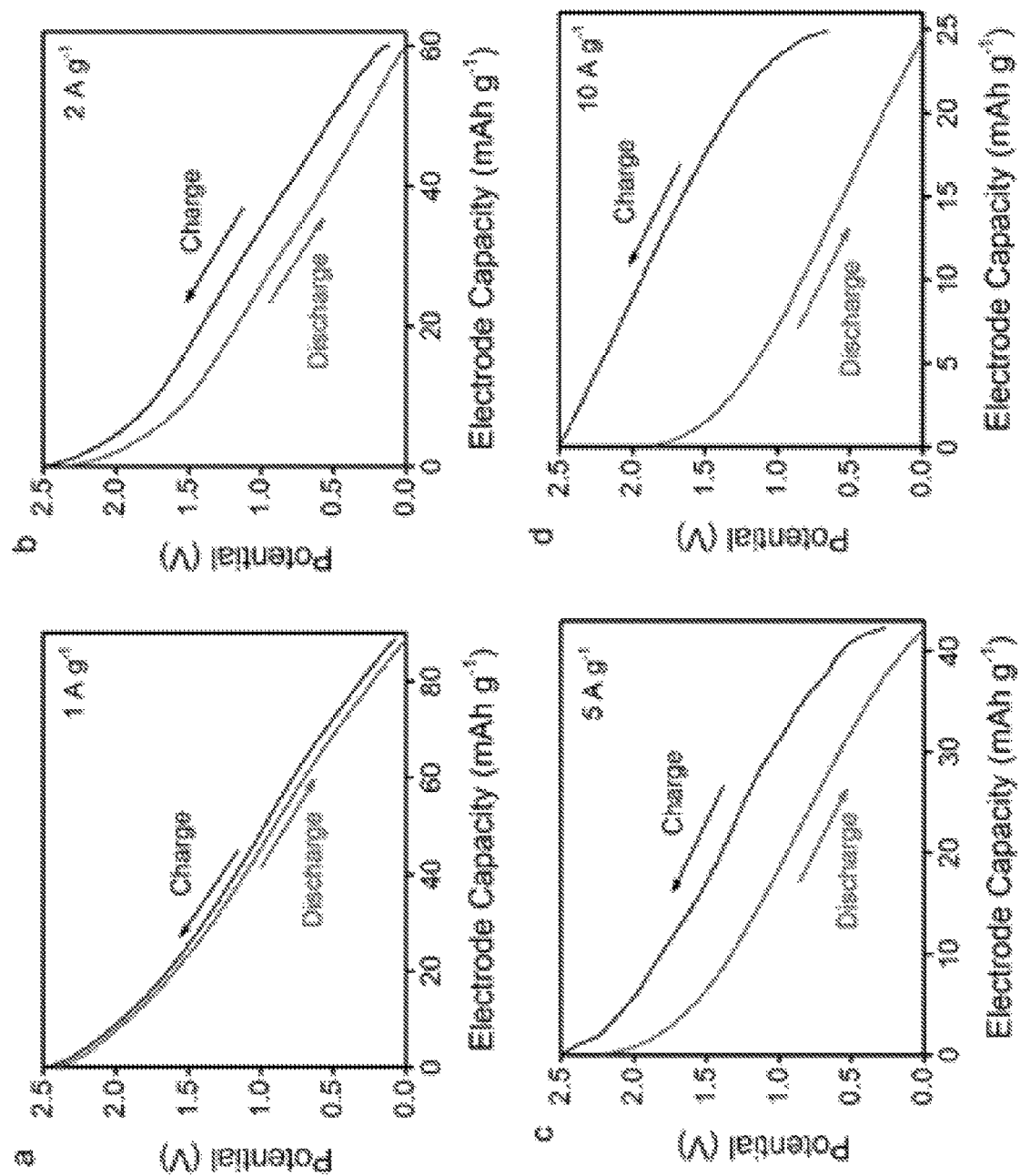
FIG. 24 shows electrode capacities of $Na_{0.29}MnO_2.H_2O$ as a function of voltage at the current denties of (a) 1 A g$^{-1}$, (b) 2 A g$^{-1}$, (c) 5 A g$^{-1}$ and (d) 10 A g$^{-1}$ during galvanostatic charge and discharge process.

Long-term energy and power performance of Na$_{0.29}$MnO$_2$—H$_2$O material were tested in symmetric full-cells for 5,000 galvanostatic cycles at a potential window of 2.5 V. Nearly linear voltage-capacity profiles at all the tested current densities pointed out a single-phase solid solution redox reaction (FIGS. 21*c*, 24). FIG. 21*d* shows that the electrode capacities of Na$_{0.29}$MnO$_2$—H$_2$O material varied from 83 mAh g$^{-1}$ to 24 mAh g$^{-1}$ as the current density increased from 1 to 10 A g$^{-1}$, corresponded with the discharge time from 160 s (a C-rate of 23) to 4.5 s (a C-rate of 800). Na$_{0.29}$MnO$_2$—H$_2$O material exhibited an excellent cycle stability up to 5000 cycles without obvious capacity loss, as well as nearly 100% coulombic efficiency and high energy efficiency at different current densities (FIG. 21*e*). At the low current densities Na$_{0.29}$MnO$_2$—H$_2$O showed a continuous increase capacity upon cycling. Such behaviour has been attributed to the slow building-up of ionic interface during the initial cycling before the electrode reached its best electrochemical condition. FIG. 21*f* shows that Na$_{0.29}$MnO$_2$—H$_2$O exhibited the specific energy from 26 to 7.5 Wh kg$^{-1}$ and the specific power from 625 to 6250 W kg$^{-1}$. These values are higher or comparable with several aqueous or nonaqueous EES devices, including Panasonic (17500) Li-ion battery (data reported in less than 5 cycles), α-MnO$_2$, δ-MnO$_2$ or amorphous birnessites, and tunnel-structured Na$_{0.44}$MnO$_2$ and O$_3$ type NaMnO$_2$.

The limited capacity for aqueous Na-ion found in typical birnessite is attributed to the limited potential window (~1.2 V) and ineffective redox process. In order to elucidate the origin of high capacity found in Na$_{0.29}$MnO$_2$—H$_2$O birnessite (147 mAh g$^{-1}$), the roles of disordered nature on increasing the voltage window and therefore inhibiting the gas evolution reaction is considered, as noted below.

Figure 25:
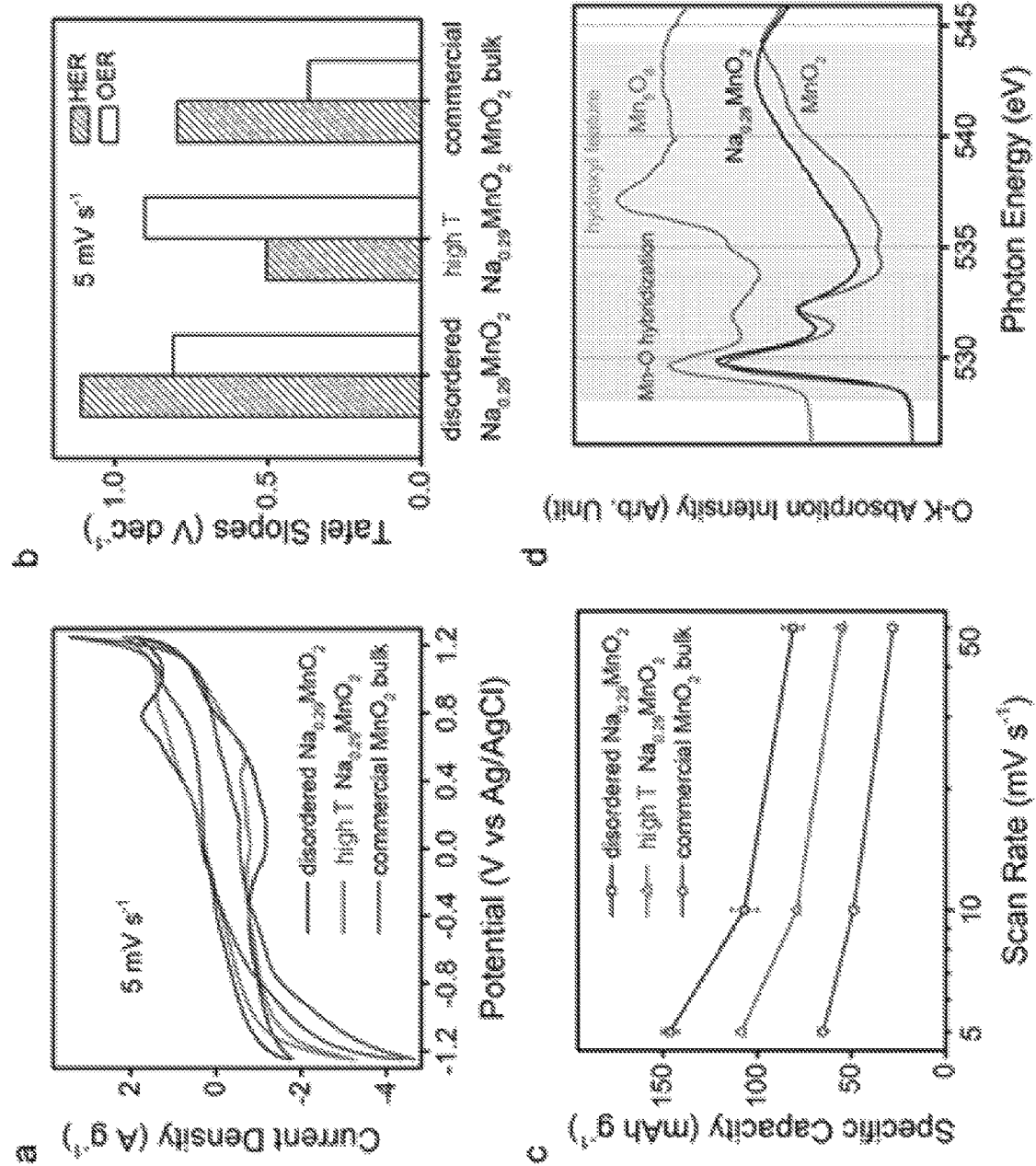
FIG. 25 shows (a) CV scans of disorder $Na_{0.29}MnO_2$—$H_2O$, high temperature treated $Na_{0.29}MnO_2$—$H_2O$ and commercial $MnO_2$ bulk materials at the scan rate of 5 mV s$^{-1}$ in a 2.5 V potential window in half-cell; (b) calculated Tafel slopes at the scan rate of 5 mV s$^{-1}$; (c) Specific capacities at the scan rate of 5, 10 and 50 mV s$^{-1}$; (d) Oxygen K-edge sXAS of electrochemically cycled $Na_{0.29}MnO_2$, $Mn_5O_8$ and anhydrous commercial $MnO_2$ bulk materials.
Figure 26:
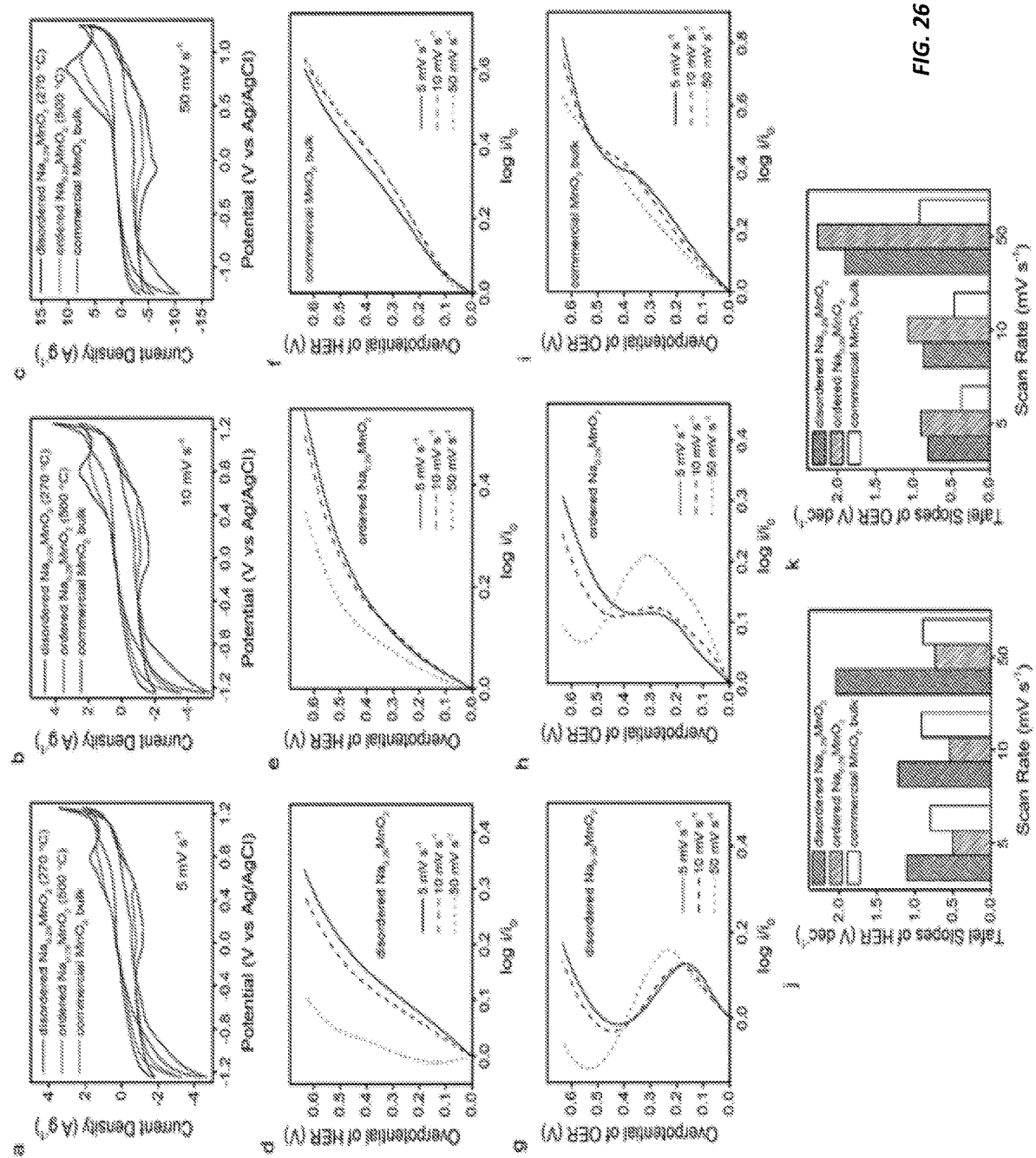
FIG. 26 shows CV scans of (a) disordered $Na_{0.29}MnO_2.H_2O$, (b) high temperature treated $Na_{0.29}MnO_2$—$H_2O$ and (c) commercial $MnO_2$ bulk materials between −1.25 V to 1.25 V (vs Ag/AgCl) in 0.1 M $Na_2SO_4$ electrolyte at the scan rates of 5, 10 and 50 mV s$^{-1}$; Tafel plots of (d, e, f) HER and (g, h, i) OER for disordered $Na_{0.29}MnO_2$, high temperature treated $Na_{0.29}MnO_2$—$H_2O$ and commercial $MnO_2$ bulk at scan rates of 5, 10 and 50 mV s$^{-1}$, and the summaried Tafel slopes of (j) HER and (k) OER.

To determine whether the structure found in Na$_{0.29}$MnO$_2$—H$_2$O affected the voltage window for aqueous Na-ion storage, CV measurement and Tafel analysis for hydrogen evolution reaction (HER) and oxygen evolution reaction (OER) were conducted using disordered $Na_{0.29}MnO_2$—$H_2O$, high-temperature treated $Na_{0.29}MnO_2$—$H_2O$ made via thermally treating disordered $Na_{0.29}MnO_2$—$H_2O$ at 500° C., and commercial anhydrous $MnO_2$ bulk materials. Compared with high-temperature treated $Na_{0.29}MnO_2$—$H_2O$ and $MnO_2$, disordered $Na_{0.29}MnO_2$—$H_2O$ showed much weaker HER current at a potential of up to −1.25 V (equivalent to overpotential of 0.63 V towards HER) and higher Tafel slopes at various scan rates (FIGS. 25a, 25b, 26), suggesting a sluggish kinetics of HER. FIG. 25b showed that although high-temperature treated and disordered $Na_{0.29}MnO_2$—$H_2O$ were both inactive towards oxygen evolution reaction (OER) even at a potential of 1.25 V (equivalent to overpotential of 0.63 V towards OER), only disordered $Na_{0.29}MnO_2$—$H_2O$ showed high overpotential towards HER and OER, suggesting that the disordered nature lead to high resistance to gas evolution reactions and therefore a kinetically stable potential window of 2.5 V in an aqueous electrolyte. In contrast, high-temperature treated $Na_{0.29}MnO_2$—$H_2O$ and commercial $MnO_2$ showed much inferior capacities compared with disordered $Na_{0.29}MnO_2$—$H_2O$ (FIG. 25c), which could also be explained by the parasitic gas evolution reactions especially HER that could deteriorate the electrode and cause capacity loss at prolonged cycles.

WORKING EXAMPLES

Material synthesis. $Mn_3O_4$ nanoparticles were first synthesized via a solution phase method. In a typical synthesis, $MnCl_2.4H_2O$ (0.7 g, Alfa Aesar, 99% metals basis) was fully dissolved by deionized water (140 mL, 18.2 MΩ; Millipore, Inc.) in a 500 mL flask under vigorous stirring at room temperature. The aqueous solution of NaOH (Alfa Aesar, 99.98% metals basis) with a concentration of 0.123 g mL$^{-1}$ was injected at a rate of 0.167 mL min$^{-1}$ for 50 min using an automatic syringe (HSW Inc.). After injection, the mixture continuously reacted for another 30 min till dark brown precipitate was formed. The resulting product was separated by centrifuging and then washed by deionized water and ethanol consecutively. The obtained products ($Mn_3O_4$ nanoparticles) were finally vacuum-dried.

In the synthesis of sodium-manganese oxides, NaOH (Alfa Aesar, 99.99% metals basis) and 100 mg $Mn_3O_4$ nanoparticles were ground in mortar with the molar ratios of 0.5, 1, 1.5, 2 and 4, respectively. The resulting mixture of NaOH and $Mn_3O_4$ was heated in tube furnace (Thermal Scientific, Inc.) in the open air at 270° C. for 6 hours. The obtained solids were thoroughly washed with deionized water to remove the possible NaOH residual and vacuum-dried for overnight. The high-temperature treated $Na_{0.29}MnO_2$—$H_2O$ material was obtained by thermal treatment of the as-synthesized disordered $Na_{0.29}MnO_2$ at 500° C. for 2 hours in the open air. The $MnO_2$ birnessite with low sodium concentration was synthesize via a wet chemistry method. Aqueous $MnCl_2$ (5 mg mL$^{-1}$) precursor was injected into 20 mL NaOH solution with a concentration of 5.7 mg mL$^{-1}$ at the rate of 0.167 mL min$^{-1}$ for 1 hour, and the obtained product was vacuum-dried after washed by deionized water and ethanol. And then the solids was annealed in the open at 270° C. for 6 hours.

Electrochemical Measurements

Half-cell test: Cyclic voltammetry (CV) measurements of sodium-manganese oxide were conducted using a three-electrode half-cell powered by CHI 660d single channel electrochemical workstation. The three-electrode system contained a glassy carbon rotating disc electrode (Pine Instrument) as the working electrode, platinum wire and silver-silver chloride (Ag/AgCl) electrode as counter and reference electrodes, respectively. The ink material was prepared by grinding mixture of 7 mg sodium-manganese oxide and 3 mg carbon black (Alfa Aesar, >99.9%). The resulting mixture was mixed with deionized water to make an ink solution of 0.5 mg mL$^{-1}$. The resulting solution was subsequently sonicated until the materials were homogeneously dispersed. In a typical half-cell measurement, 10 μL suspension containing 3.5 μg sodium-manganese oxide and 1.5 μg carbon black was drop-cast onto the glassy carbon disc electrode (0.5 cm in diameter) and vacuum-dried. The CV measurements of electrodes were conducted in a 250 mL flat-bottom flask containing 100 mL argon-purged $Na_2SO_4$ aqueous electrolyte (0.1 M) at a rotating rate of 500 rpm. The CV data were obtained within an applied potential range from −1.25 V to 1.25 V (vs Ag/AgCl) for 3 cycles, and the third CV cycle was used for the calculation of storage capacity.

Diffusivity Measurements

The diffusivity measurements was tested in a typical half-cell setting as described above, except 40 ug active materials sodium-manganese oxides was loaded on working electrode and 0.25 M $Na_2SO_4$ was used as electrolyte. A constant negative current pulse of 1 uA was first applied to working electrode and was held for 15 seconds to discharge the electrode from the open circuit potential. After that, the working electrode was relaxed and potential changes were collected for another 1000 seconds.

Full-Cell Test

Symmetric two-electrode full-cells with $Na_{0.29}MnO_2$—$H_2O$ electrodes were assembled and measured to characterize the energy/power performance and the long cycle stability as well. Electrodes were made by drop casting the slurry containing ~5 mg $Na_{0.29}MnO_2$—$H_2O$ and 1.25 mg carbon black as a mass ratio of 4:1 on Toray carbon paper (E-Tek, Inc., 1.5 cm in diameter). The resulting electrodes were weighed with an accurate mass loading of active material after vacuum-dried over-night. Two symmetric electrodes were separated by cellulose-based filter paper (Whatman), and 150 μL $Na_2SO_4$ aqueous solution (1 M) was used as the electrolyte. The cell stack of electrodes and separator was tightened by stainless plate and compression spring to ensure good electrical contact, and then assembled in the split button-cells (model: EQ-STC, MTI Corp.). Galvanostatic charge and discharge measurements of symmetric full-cells were conducted on the battery analyzer (model: B-TG, Arbin Instruments) within 2.5 V potential window for 5000 cycles at the constant current densities of 1, 2, 5 and 10 A g$^{-1}$. All the electrochemical calculations are provided in the supporting information.

X-Ray and Neutron Scattering Characterization

X-ray diffraction measurements were conducted at 17-BM-B at the Advanced Photon Source at the Argonne National Laboratory with a wavelength of λ=0.72768 Å. In-situ XRD of electrochemical half-cell measurements were conducted in a home-made cell consisted of thin carbon paper (E-Tek, Inc.) as working electrode, platinum wire and micro Ag/AgCl electrode as counter and reference electrodes, respectively. The $Na_2SO_4$ aqueous electrolyte (1 M) was used as the electrolyte. The suspension of a mixture of $Na_{0.29}MnO_2$ and carbon black was drop cast on the thin carbon paper, and then dried naturally in air. The cellulosed based filter paper was used as separator. The cell was then assembled for X-ray measurements. In-situ XRD tests were performed during CV scans from −1.25 V to 1.25 V (vs Ag/AgCl) at the scan rates of 5 mV s$^{-1}$. GSAS-II software was used to analyze the structural changes during the charge and discharge processes. The total neutron scattering experiment was conducted at the Nanoscale-Ordered Materials Diffractometer (NOMAD) beamline at Spallation Neutron Source at Oak Ridge National Laboratory. The pair distribution function (PDF) analysis was conducted using PDFgui software.

EDS and TEM Characterizations

Energy dispersive X-ray spectroscopy (EDS) was conducted for elemental analysis by an Amray 3300FE field emission SEM with a PGT Imix-PC microanalysis system at University of New Hampshire. Regular transmission electron microscopy (TEM) images were collected on Zeiss/LEO 922 Omega TEM at University of New Hampshire.

The present invention therefore describes the synthesis of Na-rich $Na_{0.29}MnO_2 \cdot H_2O$ via a solid-state reaction between $Mn_3O_4$ and NaOH. The conversion from $Mn_3O_4$ spinel to monoclinic $Mn_5O_8$, and to triclinic $Na_{0.29}MnO_2$—$H_2O$ birnessite driven by the Na intercalation was confirmed by neutron total scattering experiments and PDF analysis. The O—K edge soft X-ray absorption measurements and Tafel analysis for gas evolution reactions suggested that interplay between Na-ion, structural water and Mn valences found in high-temperature treated $Na_{0.29}MnO_2$ might account for its high overpotential toward gas evolution reactions and thereby the kinetically stable potential window of 2.5 V in an aqueous electrolyte. Moreover, electrokinetic analysis and insitu XRD measurements both pointed to a high electron transfer reaction (0.36 and 0.41 electrons) during charging/discharging processes, benefited from the Na-rich structure. The reported promotional effects of the disordered and Na-rich structure on storage capacity of layered birnessite open up a new strategy to design high capacity electrode materials for aqueous energy storage.

TABLE 1

Summaried atomic ratio A/Mn (A is the cation including Na$^+$, K$^+$) of MnO$_2$ birnessite synthesized via a solid-state reaction compared with that of a wet chemistry method and those of other works.

| Number | Sythesis Method | A/Mn | Analysis Tool | Reference |
|---|---|---|---|---|
| 1 | $Mn_3O_4$ + NaOH, in air, 270° C., 6 hours, solid-state reaction | 0.29 | EDS | This work |
| 2 | $Mn^{2+}$ + NaOH in solution with open air | 0.17 | EDS | This work |
| 3 | $Mn^{2+}$ + KOH in solution with open air | 0.15 | EDS | Ref. 1 |
| 4 | $Mn^{2+}$ + $K_2S_2O_8$ + NaOH in solution | 0.1 | ICP | Ref. 2 |
| 5 | $Mn^{2+}$ + KMnO$_4$ in hydrothermal reaction, 240° C., 3 hours | 0.06 | XPS (surface ratio) | Ref. 3 |
| 6 | KMnO$_4$ + HCl in autoclaved reaction, 140° C., 100 min | 0.12(0.01) | EDS & ICP-AES | Ref. 4 |
| 7 | $Mn^{2+}$ + NaOH, air bubble | 0.25 | ICP-AES | Ref. 5 |

*Note:
the averaged A/Mn ratio of MnO$_2$ made via wet chemistry methods is about 0.14.

REFERENCES

1 Yeager, M. et al. Highly Efficient K0.15MnO2 Birnessite Nanosheets for Stable Pseudocapacitive Cathodes. *The Journal of Physical Chemistry C* 116, 20173-20181, doi: 10.1021/jp304809r (2012).

2 Qu, Q. et al. Electrochemical Performance of MnO2 Nanorods in Neutral Aqueous Electrolytes as a Cathode for Asymmetric Supercapacitors. *The Journal of Physical Chemistry C* 113, 14020-14027, doi:10.1021/jp8113094 (2009).

3 Wang, J., Zhang, G. & Zhang, P. Layered birnessite-type MnO2 with surface pits for enhanced catalytic formaldehyde oxidation activity. *J. Mater. Chem. A* 5, 5719-5725, doi:10.1039/C6TA09793F (2017).

4 Zhu, H. T. et al. Birnessite-type MnO2 Nanowalls and Their Magnetic Properties. *The Journal of Physical Chemistry C* 112, 17089-17094, doi:10.1021/jp804673n (2008).

5 Cai, J., Liu, J. & Suib, S. L. Preparative Parameters and Framework Dopant Effects in the Synthesis of Layer-Structure Birnessite by Air Oxidation. *Chem. Mat.* 14, 2071-2077, doi:10.1021/cm010771h (2002).

TABLE 2

Refined crystal structural parameters of $Mn_5O_8$ obtained by using the fitting of neutron scattering data with $R_{wp} = 5.93\%$. The x, y, z and mult indicated the atom positions and atom numbers in the unit cell, respectively. Frac and Uiso represents the occupation and isotropic thermal parameters, respectively. The mult shows the atom numbers in the unit cell. All the corresponding values are provided in the table below.
Refined crystal structural parameters of $Mn_5O_8$

| Atom | Type | x | y | z | frac | mult | Uiso |
|---|---|---|---|---|---|---|---|
| Mn1 | Mn + 4 | 0.000 | 0.000 | 0.500 | 1.000 | 2 | 0.014 |
| Mn2 | Mn + 4 | 0.000 | 0.258 | 0.000 | 1.000 | 4 | 0.010 |
| Mn3 | Mn + 2 | 0.277 | 0.000 | 0.347 | 1.000 | 4 | 0.021 |
| O1 | O − 2 | 0.890 | 0.227 | 0.598 | 1.000 | 8 | 0.015 |
| O2 | O − 2 | 0.899 | 0.000 | 0.088 | 1.000 | 4 | 0.015 |
| O3 | O − 2 | 0.395 | 0.000 | 0.069 | 1.000 | 4 | 0.015 |

Space group: C 2/m
a = 10.397 b = 5.725 c = 4.882 (Å) α = 90 β = 109.816 γ = 90 size: 0.008 μm V = 273.392 (Å$^3$)

TABLE 3

Refined crystal structural parameters of $Na_{0.13}MnO_{1.74}$—$H_2O$ ($Mn_5O_8$ and $MnO_2$) with $R_{wp}$ = 6.04%, showing the phase fraction of $Mn_5O_8$ and $MnO_2$ (by mass) is 56% to 44%.

Refined crystal structural parameters of $Mn_5O_8$

| Atom | Type | x | y | z | frac | mult | Uiso |
|---|---|---|---|---|---|---|---|
| Mn1 | Mn + 4 | 0.000 | 0.000 | 0.500 | 1.000 | 2 | 0.005 |
| Mn2 | Mn + 4 | 0.000 | 0.269 | 0.000 | 1.000 | 4 | 0.018 |
| Mn3 | Mn + 2 | 0.262 | 0.000 | 0.349 | 1.000 | 4 | 0.016 |
| O1 | O − 2 | 0.888 | 0.229 | 0.582 | 1.000 | 8 | 0.026 |
| O2 | O − 2 | 0.901 | 0.000 | 0.095 | 1.000 | 4 | 0.015 |
| O3 | O − 2 | 0.405 | 0.000 | 0.094 | 1.000 | 4 | 0.031 |

Space group: C 2/m
a = 10.432 b = 5.723 c = 4.876 (Å) α = 90 β = 110.012 γ = 90 size: 0.009 μm V = 273.539 (Å³)

Refined crystal structural parameters of $MnO_2$

| Atom | Type | x | y | z | frac | mult | Uiso |
|---|---|---|---|---|---|---|---|
| Mn1 | Mn + 4 | 0.000 | 0.000 | 0.000 | 1.000 | 2 | 0.029 |
| O1 | O − 2 | 0.386 | −0.055 | 0.131 | 1.000 | 4 | 0.050 |
| Na1 | Na + 1 | 0.544 | 0.365 | 0.450 | 0.147 | 4 | 0.006 |
| O2 | O − 2 | 0.604 | 0.333 | 0.513 | 0.602 | 4 | 0.106 |

Space group: C − 1
a = 5.058 b = 2.731 c = 7.387 (Å) α = 87.511 β = 104.993 γ = 91.302 size: 0.004 μm V = 98.471 (Å³)

TABLE 4

Refined crystal structural parameters of $Na_{0.25}MnO_{1.84}$—$H_2O$ ($Mn_5O_8$ and $MnO_2$) with $R_{wp}$ = 9.40%, showing the phase fraction of $Mn_5O_8$ and $MnO_2$ (by mass) is 36% to 65%.

Refined crystal structural parameters of $Mn_5O_8$

| Atom | Type | x | y | z | frac | mult | Uiso |
|---|---|---|---|---|---|---|---|
| Mn1 | Mn + 4 | 0.000 | 0.000 | 0.500 | 1.000 | 2 | 0.011 |
| Mn2 | Mn + 4 | 0.000 | 0.281 | 0.000 | 1.000 | 4 | 0.020 |
| Mn3 | Mn + 2 | 0.248 | 0.000 | 0.327 | 1.000 | 4 | 0.006 |
| O1 | O − 2 | 0.888 | 0.230 | 0.595 | 1.000 | 8 | 0.016 |
| O2 | O − 2 | 0.903 | 0.000 | 0.094 | 1.000 | 4 | 0.037 |
| O3 | O − 2 | 0.428 | 0.000 | 0.080 | 1.000 | 4 | 0.038 |

Space group: C 2/m
a = 10.405 b = 5.740 c = 4.876 (Å) α = 90 β = 109.807 γ = 90 size: 0.005 μm V = 273.954 (Å³)

Refined crystal structural parameters of $MnO_2$

| Atom | Type | x | y | z | frac | mult | Uiso |
|---|---|---|---|---|---|---|---|
| Mn1 | Mn + 4 | 0.000 | 0.000 | 0.000 | 1.000 | 2 | 0.052 |
| O1 | O − 2 | 0.391 | −0.044 | 0.138 | 1.000 | 4 | 0.048 |
| Na1 | Na + 1 | 0.515 | 0.333 | 0.450 | 0.137 | 4 | 0.007 |
| O2 | O − 2 | 0.611 | 0.342 | 0.516 | 0.448 | 4 | 0.112 |

Space group: C − 1
a = 5.070 b = 2.739 c = 7.363 (Å) α = 86.894 β = 104.782 γ = 90.886 size: 0.011 μm V = 98.730 (Å³)

TABLE 5

Refined crystal structural parameters of $Na_{0.29}MnO_2$—$H_2O$ (no $Mn_5O_8$ was observed) with $R_{wp}$ = 13.45%.

Refined crystal structural parameters of $Na_{0.29}MnO_2$

| Atom | Type | x | y | z | frac | mult | Uiso |
|---|---|---|---|---|---|---|---|
| Mn1 | Mn + 4 | 0.000 | 0.000 | 0.000 | 1.000 | 2 | 0.018 |
| O1 | O − 2 | 0.384 | −0.038 | 0.135 | 1.000 | 4 | 0.052 |
| Na1 | Na + 1 | 0.565 | 0.161 | 0.450 | 0.145 | 4 | 0.006 |
| O2 | O − 2 | 0.590 | 0.330 | 0.514 | 0.500 | 4 | 0.107 |

Space group: C − 1
a = 5.048 b = 2.755 c = 7.381 (Å) α = 86.479 β = 104.175 γ = 90.402 size: 0.007 μm V = 99.343 (Å³)

What is claimed is:

1. A method for forming an electrode having a layered metal oxide/conductive polymer comprising:
providing a metal oxide;
providing a positively charged polymeric ionomer;
providing a negatively charged polymeric ionomer;
providing water and mixing the metal oxide, positively charged polymeric ionomer and negative charged polymeric ionomer for a period of time of at least 100 hours to form a layered metal oxide with said positively and negatively charged polymeric ionomer which has in-plane chemical bonding with a dissociation energy of 4 to 7 electron volts.

2. The method of claim 1 wherein said metal oxide is selected from V2O5, LiMnO2, TiO2, MoO2, MoO3, Nb2O5 and LiCoO2.

3. The method of claim 1 wherein said positively charged polymeric ionomer comprises poly (3,4-ethylene dioxythiophene).

4. The method of claim 1 wherein said negatively charged polymeric ionomer comprises poly(styrenesulfonate).

5. The method of claim 1 wherein said metal oxide and conductive polymer are present at a weight ratio of 1:1 to 8:1.

6. The method of claim 1 wherein said layered metal oxide conductive polymer is present at a thickness in the range of 1 nm to 30 nm.

7. The method of claim 1 wherein metal oxide comprises V2O5 and said conductive polymer comprises poly(3,4-ethylene dioxythiophene) in combination with poly(styrenesulfonate) and indicates a capacity of greater than 75 mAh/g at a scan rate of 10 mV/s.

8. The method of claim 1 wherein said layered metal oxide/conductive polymer indicates a capacity in the range of 75 mAh/g to 160 mAh/g at a scan rate of 10 mV/s.

9. The method of claim 1 wherein said metal oxide comprises LiMnO2 and said conductive polymer comprises poly(3,4-ethylene dioxythiophene) in combination with poly(styrenesulfonate) and indicates a capacity of greater than or equal to 60 mAh/g at a scan rate of 10-20 mV/sec.

10. The method of claim 9 wherein said layered metal oxide/conductive polymer indicates a capacity in the range of 20 mAh/g to 70 mAh/g at a scan rate of 10-500 mV/sec.

* * * * *